(12) United States Patent
Schucker

(10) Patent No.: US 12,122,658 B2
(45) Date of Patent: *Oct. 22, 2024

(54) PERFORMANCE OF A BEVERAGE DISPENSER

(71) Applicant: Josef Schucker, Ronco Sopra Ascona (CH)

(72) Inventor: Josef Schucker, Ronco Sopra Ascona (CH)

(73) Assignee: RIPRUP Company S.A., St. Peter Port Gurnsey (GG)

( * ) Notice: Subject to any disclaimer, the term of this patent is extended or adjusted under 35 U.S.C. 154(b) by 0 days.

This patent is subject to a terminal disclaimer.

(21) Appl. No.: 18/128,486

(22) Filed: Mar. 30, 2023

(65) Prior Publication Data

US 2023/0234827 A1  Jul. 27, 2023

Related U.S. Application Data

(63) Continuation of application No. 17/341,692, filed on Jun. 8, 2021, now Pat. No. 11,643,320.

(30) Foreign Application Priority Data

Jun. 8, 2020 (EP) .................................. 20178800
Jun. 4, 2021 (EP) .................................. 21177798

(51) Int. Cl.
*B67D 1/08* (2006.01)
*A23L 2/54* (2006.01)
(Continued)

(52) U.S. Cl.
CPC .............. *B67D 1/0888* (2013.01); *A23L 2/54* (2013.01); *A47G 19/2261* (2013.01);
(Continued)

(58) Field of Classification Search
CPC ...... B67D 1/0888; B67D 1/0015; B67D 1/00; A23L 2/54; A47G 19/2261;
(Continued)

(56) References Cited

U.S. PATENT DOCUMENTS 9,334,150 B1 * 5/2016 Ost ...................... B67D 1/1236
2005/0087255 A1 * 4/2005 Humphrey .............. G07F 7/025
141/94

* cited by examiner

*Primary Examiner* — Ankur Jain
(74) *Attorney, Agent, or Firm* — Bryan W. Bockhop; Bockhop Intellectual Property Law, LLC

(57) ABSTRACT

The invention discloses a portable beverage vessel, comprising:
a bottom portion;
a wall extending from the bottom portion, wherein a upper portion of the wall forms an opening through which beverage can be poured into or out of the portable beverage vessel;
a first container element;
a second container element, wherein a cavity is formed between the first container element and the second container element; and
a display device positioned in the cavity and having a display element for displaying information;
wherein the first container element can be at least a part of the bottom portion and/or at least a part of the wall;
wherein the second container element can be at least a part of the bottom portion and/or at least a part of the wall; and
wherein the first container element and the second container element comprise at least one of the following:
glass;
ceramics;
$SiO_2$;
wherein the first container element and the second container element are connected by at least one of welding,
(Continued)

laser welding, infrared welding, infrared laser welding and welding by an infrared laser emitting pulses of a duration shorter than 1 psec.

9 Claims, 10 Drawing Sheets

(51) Int. Cl.
    *A47G 19/22*     (2006.01)
    *B67D 1/00*     (2006.01)
    *C02F 1/68*     (2023.01)
    *G05B 15/02*     (2006.01)
    *C02F 1/44*     (2023.01)

(52) U.S. Cl.
    CPC .............. *B67D 1/0015* (2013.01); *C02F 1/68* (2013.01); *G05B 15/02* (2013.01); *A23V 2002/00* (2013.01); *C02F 1/441* (2013.01)

(58) Field of Classification Search
    CPC ............ A47G 2019/2244; A47G 19/12; A47G 23/16; A47G 19/2227; C02F 1/68; C02F 1/441; G05B 15/02; A23V 2002/00; B65D 83/44; B65D 23/00; B65D 25/00; B65D 83/28
    See application file for complete search history.

PERFORMANCE OF A BEVERAGE DISPENSER

CROSS-REFERENCE TO RELATED APPLICATION(S)

This application is a continuation of U.S. patent application Ser. No. 17/341,692, filed on Jun. 8, 2021, the entirety of each of which is hereby incorporated herein by reference.

This application claims the benefit of European Patent Application No. EP20178800.7, filed Jun. 8, 2020, European Patent Application No. EP21177798.2, filed Jun. 4, 2021, the entirety of each of which is hereby incorporated herein by reference.

BACKGROUND OF THE INVENTION

1. Field of the Invention

The present invention relates to a portable beverage vessel with a display element. The portable beverage vessel may be a carafe, a bottle, a glass, a cup or the like. The portable beverage vessel is designed to improve output of a beverage dispenser and to optionally display information about the beverage in the portable beverage vessel.

2. Description of the Related Art

EP 3 281 566 A1 discloses an intelligent houseware comprising a housing, a container for storing food and a touch sensitive surface arranged at the surface of the housing, wherein said touch sensitive surface is adapted to receive data input by a human and/or to display information.

US 2010/0045705 A discloses a food container comprising a flexible display surface. The display surface is formed by an e-paper or a wearable.

CN105286423 discloses a smart cup with a display.

CN104825026 discloses a water cup with networking function.

US 2010/0182518 A discloses a container or vessel with an interactive display screen.

WO 2016/115723 A1 relates to computer enhanced porcelain ware having a touch screen on an outer wall.

The prior art beverage vessels cannot cooperate with a beverage dispenser to improve output of the beverage dispenser.

The above portable beverage vessels suffer the disadvantage that the display element may be subjected to wear during use and during washing in the dish washer. Thereby, the display element may be deteriorated after a relatively short time span of intensive use.

SUMMARY OF THE INVENTION

It is an object of the present invention to provide a portable beverage vessel with display element, wherein the display element is protected from wear.

The present invention discloses a portable beverage vessel comprising a bottom portion and a wall extending from the bottom portion, wherein an upper portion of the wall forms an opening through which beverage can be poured into or out of the beverage vessel. The portable beverage vessel further comprises a first container element and a second container element, wherein a cavity is formed between the first container element and the second container element. The first container element can be at least a part of the bottom portion and/or at least a part of the wall. The second container element can be at least a part of the bottom portion and/or at least a part of the wall. In one embodiment the wall element, the bottom element, the first container element and/or the second container element may be transparent. This embodiment is preferred, since the portable beverage vessel embodies a smart glass bottle, a smart glass carafe, a smart transparent plastic bottle, a smart transparent plastic carafe or the like. A vessel controller is positioned in the cavity. The vessel controller comprises a display element for displaying information. The vessel controller further comprises a receiving element for receiving information to be displayed by the display element. The receiving element is adapted to receive radio communication, such as near field communication (NFC), wireless local area network (WLAN), and/or a low frequency magnetic field. Since the vessel controller is encapsulated between the first and container element, it is not subject to wear during use of the portable beverage vessel or during cleaning the portable beverage vessel in a dishwasher. The portable beverage vessel may be a carafe, a bottle, a glass, a mug, a cup or the like. The near field communication may be established by RFID or the like. The low frequency magnetic field may range from 1 to 50 Hz. The low frequency magnetic field may be adapted to manipulate mechanical elements on the display element. The mechanical elements may display alphanumeric characters or symbols.

The display element may display any alphanumeric character, symbols or colors as information. This information may be useful to identify a user, who requested beverage or may identify (indicate) the beverage that has to be poured into the portable beverage vessel.

The bottom portion comprises the first container element and the second container element. The wall element extends from the first container element. In this embodiment, the vessel controller is arranged in the bottom portion of the portable beverage vessel.

Alternatively or additionally the wall may comprise the first container element and the second container element. In this embodiment, the vessel controller is arranged above the bottom portion in the wall.

The first container element and the second container element may comprise glass, ceramics $SIO_2$, plastics or the like. Suitable plastic may include BPA free plastic or polyethylene terephthalate (PET) for example.

In one embodiment the first container element and the second container element are connected by melting. In this case the first container element and/or the second container element are partially melted and forced against each other to be combined into one element.

Glass melts at a temperature of approximately 600° C. to 800° C. In another embodiment the first container element and the second container element are connected by welding. Welding of glass is known to the person skilled in the art and does not have to be described here in in further detail.

In one embodiment a localized hydrogen flame may heat the first container element and the second container element for welding the first container element with the second container element. A hydrogen flame may have a temperature of 3000° C. for locally heating the first container element and the second container element before welding the first container element and the second container element. By this technique the glass is only heated locally and for a short period.

In still another embodiment the first container element may be welded with the second container element by laser. In still another embodiment the first container element may be welded with the second container element by infrared radiation. The first container element may be welded with the second container element by infrared laser radiation. In yet another embodiment the first container element may be welded with the second container element by infrared laser pulses. In yet another embodiment the first container element may be welded with the second container element by welding by infrared laser pulses shorter than 1 psec, preferable less than 100 fsec., more preferred less than 50 fsec. The infrared radiation, the infrared laser radiation and the infrared laser pulses may have a wavelength in the range of approximately 980 nm to approximately 1080 nm, preferably between approximately 1100 nm to approximately 1150 nm. Laser pulses shorter than 1 psec. may be generated by so called femtosecond lasers.

Since the first container element and the second container element are connected by melting and/or welding, no water or other fluids can enter the cavity and damage the vessel controller.

The first container element and the second container element may form a cavity comprising a disk shape, a cone-shape, a semispherical shape, a truncated shape, a tapered shape, a triangular cross section, a trapezoid cross section. The display element may be located in the cavity juxtaposed to the first container element. The cavity may be vacuumed or filled with protective (inert) gas for avoiding fogging of the cavity.

The vessel controller may comprise an antenna, a memory, a capacitor for storing operation power and a processor. In one embodiment the antenna may receive information. In another embodiment the antenna may both receive information and energy for operating the vessel controller. The antenna may be an RFID antenna and may be coupled with a transceiver to demodulate the information. The transceiver may transmit the information to the processor, which stores the information in the memory and/or display the information on the display element. The antenna may also receive energy that is stored in a capacitor for supplying the processor, the memory and/or the display element (energy harvesting).

The display element may comprise at least one LED, at least one OLED, a LED display, an OLED display, an array of LEDs or OLEDs, a display matrix, an e-paper, an electrophoretic e-paper, a liquid crystal e-paper, a bi-stable display, a bi-stable liquid crystal display. E-paper, electrophoretic e-paper, the bi-stable display and the bi-stable liquid crystal display have the advantage that no energy is needed for displaying information on the display element, once the information has been updated on the display element. For such display elements no accumulator is required and energy for operation of the vessel controller can be received by the antenna.

In one embodiment the vessel controller may be an RFID display. The RFID display and/or any other vessel controller is selected such that it comprises a maximum storage temperature of 60° C., since the portable beverage vessel is subjected to temperatures in a range of 55° C. to 60° C. in a dishwasher. Such RFID display with e-ink display is commercially available from P.E.R. Flucht-und Rettungssysteme GmbH, Germany under the product name PERMALUX P-29E.

The invention also discloses a method of manufacturing a portable beverage vessel comprising a bottom portion and a wall extending from the bottom portion, wherein the wall element forms an opening opposite to the bottom portion. The wall element forms an opening opposite to the first container element. The beverage can be poured through the opening into the portable beverage vessel and out of the portable beverage vessel. The method comprises the step of providing a first container element, wherein the bottom portion and/or the wall comprises the first container element. The method further comprises the step of coupling the first container element with a second container element. A cavity is formed between the first container element and the second container element. The method further comprises the step of positioning a vessel controller having a display element between the first container element and the second container element before coupling the first container element with the second container element.

Glass melts at a temperature of approximately 600° C. to 800° C. The step of coupling the first container element with the second container element comprises the step of melting the second container element to the first container element and/or the step of the welding the first container element with the second container element.

In one embodiment a localized hydrogen flame may heat the first container element and the second container element for welding the first container element with the second container element. A hydrogen flame may have a temperature of 3000° C. for locally heating the first container element and the second container element before welding the first container element and the second container element. By this technique the glass is only heated locally and for a short period.

In another embodiment the first container element may be welded with the second container element by laser. In still another embodiment the first container element may be welded with the second container element by infrared radiation. The first container element may be welded with the second container element by infrared laser radiation. In yet another embodiment the first container element may be welded with the second container element by infrared laser pulses. In yet another embodiment the first container element may be welded with the second container element by welding by infrared laser pulses shorter than 1 psec., preferable less than 100 fsec., more preferred less than 50 fsec. The infrared radiation, the infrared laser radiation and the infrared laser pulses may have a wavelength in the range of approximately 980 nm to approximately 1080 nm, preferably between approximately 1100 nm to approximately 1150 nm. Laser pulses shorter than 1 psec. may be generated by so called femtosecond lasers.

The invention also discloses a method for dispensing a beverage into a portable beverage vessel comprising the step of receiving an order for a requested beverage at the beverage dispenser. The method further comprises the step of outputting the requested beverage into a portable beverage vessel by the beverage dispenser. The method further comprises the step of transmitting information relating to the requested beverage that was output into the portable beverage vessel to a vessel controller of the portable beverage vessel. The method further comprises the step of displaying the information relating to the requested beverage that was output into the portable beverage vessel on a display element of the vessel controller of the portable beverage vessel.

This method is particularly useful in a hotel environment, restaurant environment, office environment, shop environment, beverage store, but also home environment, since the beverage dispenser can output information about the beverage that has been poured into the portable beverage vessel to the vessel controller of the portable beverage vessel. Further, the beverage dispenser may transmit information relating to the requested beverage, such as information for identifying a person, who requested the beverage, to the vessel controller of the portable beverage vessel. The method may ensure that each user requesting beverage is supplied with the appropriate beverage that was requested by him. Thus, the term "information relating to the requested beverage" may include the type of beverage in the portable beverage vessel, an identification of a user, who requested the beverage, an identification of a location in a restaurant, hotel, meeting area to which the portable beverage vessel has to be carried, the time stamp of the filling event, the amount of beverage filled into the portable beverage vessel within a predetermined period, the number of refill events within a predetermined period, the amount of purchased bottles saved, a parameter of the beverage in the portable beverage vessel, such as temperature, carbonization, mineralization, flavoring or any other useful information relating to the beverage in the portable beverage vessel.

The term "time stamp" may also include the date. The location to which the portable beverage vessel has to be carried may include inter alia an identification of the table, to which the portable beverage vessel has to be carried in a restaurant or meeting area, a room number of a hotel, hospital or nursing home, an identification of the meeting to which the portable beverage vessel has to be carried, name of the company to which the portable beverage vessel has to be transported, name of the beverage shop to which the portable beverage vessel has to be transported, the name of the client to which the portable beverage vessel has to be transported.

The amount of beverage filled into the portable beverage vessel within a predetermined period may indicate the amount filled into the portable beverage vessel during the current day for monitoring hydration of a person, such as in a nursing environment. The number of refill events within a predetermined period may indicate the number of refill events of the portable beverage vessel during the current day for monitoring hydration of a person, such as in a nursing environment. The amount of purchased bottles saved may indicate the number of one-way bottles or returnable bottles saved for assessing the environmental benefit of the reusable and refillable beverage vessel according to the present invention.

The order supplied to the beverage dispenser may include an identification of a user who will be consumer of the beverage, such as a user who requested the beverage at the beverage dispenser, the assistant or the waiter. The order may include the above mentioned information relating to the beverage.

The order may be a message transmitted to the beverage dispenser or entered into a user interface of the beverage dispenser. In one embodiment, the step of receiving the order includes the step of receiving the order via a network. The network may be a wireless network or a wired network. The order may be transmitted by a personal electronic device carried by a waiter or a meeting room staff. The terms "receiving an order for a requested beverage by the beverage dispenser" also includes entering information about the requested beverage by a user interface of the beverage dispenser or voice recognition by the beverage dispenser.

The invention also discloses a beverage dispenser comprising a receiving device adapted to receive information about beverage selected by a user. The beverage dispenser further comprises at least one beverage preparation device adapted to generate beverage according to an order of user. The term "order of a user" comprises a user input on a user interface of the beverage dispenser, a user input on a personal electronic device, an order at a waiter or the like. The beverage dispenser comprises a nozzle adapted to output the beverage generated by the at least one beverage preparation device into a portable beverage vessel. The beverage dispenser further comprises a transmitter adapted to transmit information relating to the beverage generated by the at least one beverage preparation device to the portable beverage vessel as described above. The order may include the above mentioned information relating to the beverage. The beverage dispenser may comprise the same features as the above method.

The above described portable beverage vessel comprises a vessel controller including a receiving element, such as an antenna that is adapted to receive information relating to the beverage from the beverage dispenser. The term "information relating to the beverage" may include the type of beverage in the portable beverage vessel, a user, who requested the beverage, a location in a restaurant, hotel, meeting area to which the portable beverage vessel has to be carried, an volume of beverage, the time stamp of the filling event, a parameter of the beverage in the portable beverage vessel, such as temperature, carbonization, mineralization, flavoring or any other useful information relating to the beverage in the portable beverage vessel.

Particularly in a nursing environment transmitting the time stamp of the filling event to the vessel controller and displaying the time stamp of the filling event is useful to monitor beverage consumption of patients. In other environments transmitting the time stamp of the filling event to the vessel controller and displaying the time stamp of the filling event by the vessel controller is useful to enable a user to determine the quality of the beverage.

In one embodiment, the receiving device may comprise a network interface adapted to receive a message comprising information about beverage selected by the user.

Alternatively or additionally, the receiving device may comprise an input device by which a person inputs information about beverage selected by the user. The input device may comprise a touch sensitive display, any kind of user interface, a mechanical user interface, voice recognition or the like. The waiter may input information about beverage requested by a user, such as a guest in a restaurant or a hotel or a member of a meeting. The waiter may input the information about the beverage at the input device of the beverage dispenser or a mobile electronic device in communication with the network interface of the beverage dispenser.

It is also an object of the present invention to improve output of a beverage dispenser.

The invention discloses a method of filling beverage into a portable beverage vessel comprising the step of selecting at least one beverage by the program running on a personal electronic device having a personal electronic device processor. The at least one beverage is represented by at least one beverage parameter set. The at least one beverage parameter set is stored in beverage data. Then, the beverage vessel is positioned in the proximity of the personal electronic device by the user.

In the context of the present invention positioning the beverage vessel in the proximity of the electronic device can be interpreted such, that the distance between the beverage vessel and the personal electronic device is smaller than approximately 5 cm, preferably smaller than approximately 3 cm, more preferred smaller than approximately 1 cm. The NFC communication may be a RFID communication. The radio range of the near field communication from antenna to antenna may be smaller than approximately 5 cm, preferably smaller than approximately 3 cm, more preferred smaller than approximately 1 cm.

The antenna of the personal electronic device starts emitting a RF field. In the next step the beverage data is transmitted by a radio message from the antenna of the personal electronic device to an antenna of the beverage vessel by near field communication (NFC) controlled by the personal electronic device processor by the personal electronic device by near field communication. Electric energy from the radio message and/or RF-field received by the vessel antenna is extracted. The electric energy may be stored in an energy storage device of the beverage vessel.

The step of transmitting the beverage data from an antenna of the personal electronic device in a radio message to an antenna of the beverage vessel by near field communication controlled by the personal electronic device processor by the personal electronic device by near filed communication may comprise the step of emitting an RF field by the antenna of the personal electronic device.

Thereafter, the beverage data is stored in a memory of the beverage vessel controlled by the vessel controller after receiving the beverage data by the antenna of the beverage vessel. The vessel processor and the vessel memory are powered by the RF field received by the vessel antenna. The NFC communication may be a RFID communication.

The user positions the beverage vessel in the proximity of a beverage dispenser. The user may position the upper opening of the beverage vessel under a nozzle of the beverage dispenser. After the beverage vessel is detected in the proximity of the beverage dispenser the beverage dispenser transmits a request command from an antenna of the beverage dispenser to the antenna of the beverage vessel by near field communication requesting to transmit beverage data by a radio message. Electric energy from the radio message received by the vessel antenna is extracting. The electric energy in the energy storage device of the beverage vessel.

The step of transmitting by near filed communication under control of a dispenser controller by the beverage dispenser a request command from the antenna of the beverage dispenser to the antenna of the beverage vessel requesting to transmit beverage data in a radio message may comprise the step of transmitting a RF field by the dispenser antenna. The vessel processor and the vessel memory are powered by the RF field received by the vessel antenna.

In response to receiving the request command by the beverage vessel, the beverage data is read from the memory of the beverage vessel and the beverage data is transmitted by the antenna of the beverage vessel to the antenna of the beverage dispenser by near field communication under control of the vessel processor. In response to receiving the beverage data by the antenna of the beverage dispenser, the beverage dispenser outputs at least one beverage defined by the beverage parameter set in the beverage data into the beverage vessel under control of the dispenser controller.

The beverage vessel may be a bottle, a carafe, a glass, a cup or the like.

The beverage vessel may comprise an impedance matching circuit coupled with the antenna of the beverage vessel. The impedance matching circuit ensures that an appropriate amount of energy is transferred from the antenna. The radio signal of the radio message induces an AC current in the antenna and impedance matching circuit. The AC current is rectified by a rectifier circuit to a DC power. The voltage of the DC power may be increased by a voltage multiplier. The DC power may be supplied to the vessel processor, the vessel memory or the like. The DC power may be stored in the capacitor. This process is known as energy harvesting.

The vessel processor is only powered by the radio message, if the vessel antenna is positioned in the proximity of the antenna of the personal electronic device or the antenna of the beverage dispenser. Thereby, it can be ensured that the personal electronic device communicates only with a single beverage vessel and powers only a single beverage vessel. Thereby, the method according to the present invention can determine that the beverage vessel is positioned in the proximity of the personal electronic device or the beverage dispenser.

The short range of the near field communication and/or power harvesting ensure that the personal electronic device and/or the beverage dispenser only communicate with a single beverage vessel.

The present invention has the advantage that the user can select a desired beverage before he positions the beverage vessel underneath the nozzle of the beverage dispenser.

Thereby, the output of the beverage dispenser can be improved, since the user spends less time after positioning the beverage vessel in the beverage dispenser for selecting beverage. In prior art systems, the user had to position the beverage vessel underneath the nozzle of the beverage dispenser and select a beverage thereafter. This process was time-consuming and reduced the total output of the beverage dispenser.

In one embodiment the user may be requested by a user interface to press a start button, before the beverage is dispensed. In one embodiment the user interface may be displayed on the beverage dispenser. In another embodiment the user interface may be displayed on the personal electronic device. The personal electronic device may be coupled with the beverage dispenser by a near field network, such as RFID or Bluetooth, or any other suitable wireless network.

Since the selected beverage is stored in a memory associated with the beverage vessel the method according to the present invention does not require a permanent data connection to transmit a selected beverage from a personal electronic device to a remote server and to store the selected beverage on a remote server for retrieval by the beverage dispenser.

Thereby, reliability of a beverage dispensing system can be increased significantly and the cost associated to the beverage dispensing system can be reduced significantly.

The beverage parameter set may be a list of parameters defining type and quantity of ingredients, such as minerals, flavors and the like, volume of beverage to be dispensed, set temperature of the beverage and/or set carbonization of the beverage.

The method may comprise the step of selecting a single beverage by the program running on the personal electronic device by the user, wherein the single beverage is defined by the beverage parameter set and wherein the beverage data comprises a single beverage parameter set selected by the user. The dispenser controller determines, whether the beverage data comprises a single beverage parameter set. After determining at the beverage dispenser under control of the dispenser controller that the beverage data comprises a single beverage parameter set, the beverage defined by the single beverage parameter set is output into the beverage vessel under control of the dispenser controller.

If the user selects only a single beverage by the program running on the personal electronic device, only a single beverage parameter set is stored in the beverage data. If the dispenser controller detects that only a single beverage parameter set is stored in the received beverage data, the dispenser controller outputs the beverage defined by the single beverage parameter set without any further interaction with the user. The user does not have to touch the beverage dispenser at all, which improves hygienic conditions. Further, output of the beverage dispenser is increased.

Alternatively or additionally the beverage data may comprise a plurality of beverage data sets selected by the user. In this embodiment a plurality of beverages may be selected by the program running on the personal electronic device, wherein each beverage is defined by the beverage parameter set. The dispenser controller of the beverage dispenser determines, whether the beverage data comprises a plurality of beverage parameter sets. After the beverage dispenser determines under control of the dispenser controller that the beverage data comprises a plurality of beverage parameter sets, the dispenser controller outputs on a user interface a plurality of graphical information each representing one of the plurality of beverage parameter sets. The user selects on the user interface one graphical information each indicating one of the beverage parameter sets. Under control of the dispenser controller the beverage defined by the beverage parameter set represented by the selected graphical information is output into the beverage vessel.

In one embodiment, the method outputs the user interface on a suitable display of the beverage dispenser, such as a touch sensitive screen. In another embodiment the method outputs the user interface on the personal electronic device. The personal electronic device may be coupled with the beverage dispenser by a near field network, such as RFID or Bluetooth, or any other suitable wireless network.

In this embodiment the user may select a plurality of beverages as favorites on the personal electronic device. As soon as the user positions the beverage vessel at the beverage dispenser one of the favorite beverages may be selected for being output into the beverage vessel.

In one embodiment the beverage parameter set may include a beverage recipe defining a list of parameters defining type and quantity of ingredients. Additionally or alternatively the beverage parameter set may include a reference to a beverage recipe defined by a list of parameters defining type and quantity of the ingredients. The reference may be a number, an index, a hash value or the like. In one embodiment the beverage parameter set may include an individualized beverage recipe defined by a list of parameters defining type and quantity of ingredients.

In one embodiment the beverage parameter set may include a set mineralization of water defined by a list of parameters defining type and quantity of the ingredients, such as minerals and trace elements. Alternatively or additionally, the beverage parameter set includes an individualized set mineralization of water defined by a list of parameters defining type and quantity of the ingredients, such as minerals and trace elements.

The beverage dispenser may comprise a flow-type tempering, a flow-type carbonization and a flow-type mineralization for individually tempering, carbonizing and mineralizing a beverage. The beverage dispenser may also include a flow-type flavoring device for individually flavoring beverage. The beverage dispenser may include a database of recipes which may be retrieved by the reference to the beverage recipe described above.

The method further comprises the step of selecting on a user interface of the program running on the personal electronic device at least one of the beverage recipe desired by the user, the reference to a beverage recipe desired by the user, the individualized beverage recipe desired by the user, the set mineralization of water desired by the user, the individualized set mineralization of water desired by the user, the set temperature of beverage, the set carbonization of beverage and the set volume as a beverage parameter set.

The method may comprise the step of inputting information for identifying the user receiving the beverage into the program running on the personal electronic device and storing the information for identifying the user receiving the beverage in the beverage data. The information for identifying the user may be entered via a user interface or retrieved from a memory of the personal electronic device by the program running on the personal electronic device, such as the user name of the personal electronic device, login information or the like.

The method may comprise the step of preparing the beverage as defined by the beverage recipe stored in the beverage parameter set by the beverage dispenser under control of the dispenser controller. Alternatively or additionally, the method may comprise the step of preparing the beverage as defined by the reference to a beverage recipe stored in the beverage parameter set by the beverage dispenser under control of the dispenser controller. Alternatively or additionally, the method may prepare the beverage as defined by the individualized beverage recipe stored in the beverage parameter set by the beverage dispenser under control of the dispenser controller. Additionally or alternatively, the method may prepare the beverage as defined by the set mineralization of water stored in the beverage parameter set by the beverage dispenser under control of the dispenser controller. Alternatively or additionally the method may comprise the step of preparing the beverage as defined by the individualized set mineralization of water stored in the beverage parameter set by the beverage dispenser under control of the dispenser controller.

The method may prepare the set volume of beverage as defined by the set volume in the beverage parameter set by the beverage dispenser under control of the dispenser controller. The method may prepare the beverage as defined by the set temperature stored in the beverage parameter set by the beverage dispenser under control of the dispenser controller. The method may prepare the beverage as defined by the set carbonization stored in the beverage parameter set by the beverage dispenser under control of the dispenser controller.

The method may comprise the step of displaying at least a part of the beverage parameter set and/or beverage data of the beverage filled into the beverage vessel on a display element coupled with the beverage vessel under control of the vessel processor. In one embodiment the method may display information for identifying the user receiving the beverage. Thereby, the beverage vessel is labeled with the identity of the user and use of the beverage vessel by an unintended user can be prevented. In one embodiment the method may display a reference to a beverage recipe, such as a name of the recipe, filled into the beverage vessel on the display element coupled with the beverage vessel.

In one embodiment the method may display the date and/or time of filling the beverage vessel with beverage on the display element coupled with the beverage vessel. Thereby, the user is allowed to estimate whether the beverage in the beverage vessel is safe for drinking. Further, the user is enabled to monitor beverage consumption.

In one embodiment the method may display the volume of beverage filled into the beverage during a predetermined time span on the display element coupled with the beverage vessel. Thereby, the beverage consumption of a user can be monitored.

In one embodiment, the method can display the amount of one-way bottles saved during a predetermined time span on the display element coupled with the beverage vessel. The beverage vessel according to the present invention can be reused and less use of one-way bottles can be avoided.

In one embodiment the method may display the volume of beverage filled into the beverage vessel during the last fill event on the display element coupled with the beverage vessel for monitoring the beverage consumption of the user.

The method may store the usage data in the memory of the personal electronic device by the personal electronic device processor. The usage data may include a total volume of beverage requested by the user, a volume of beverage requested by the user during a predetermined time span, a total number of fill requests requested by the particular user, a number of fill requests requested by the particular user during a predetermined time span and/or beverage preference information of a particular user indicating the frequency distribution of at least one of a beverage parameter set, a recipe of a beverage, a reference to a beverage recipe, an individualized beverage recipe, a set mineralization of water, an individualized set mineralization of water, a set temperature of the beverage and/or a set carbonization of the beverage selected by the user. The method may propose the user information about an additional beverage defined by an additional beverage parameter set based on the usage data. The method may propose the additional beverage on a user interface of the personal electronic device and/or on a user interface of the beverage dispenser. If the user is starting to use the inventive method, a smaller number of different beverages or beverage recipes or the like is proposed to the user. As soon as the user is more experienced with the inventive method, the inventive method proposes a higher number of different beverages, beverage recipes or the like to the user.

In one embodiment the method may transmit a new beverage defined by a new beverage parameter set from a remote server by a wide range network to the program running on a personal electronic device. The user is notified about the new beverage by a signal such as an audio signal or a message. The user can store the additional beverage parameter set in the beverage data and transmit it to the beverage vessel.

In one embodiment the beverage dispenser may receive information about a new beverage defined by a new beverage parameter set from a remote server by a wide range network. Thereafter, the method proposes the user the new beverage parameter set as an additional beverage parameter set after detecting the beverage vessel in the proximity of the beverage dispenser by near field communication. The new beverage parameter set and the additional beverage parameter set form information about a new beverage and an additional beverage, respectively. If the user is informed at the beverage dispenser about a new beverage, the number of signals, such as audio signals and visual messages output by the personal electronic device is reduced. Further, the user can consume the new beverage shortly after he is informed about the new beverage and it is less likely that the user will forget that a new beverage is available.

In one embodiment, the step of proposing the user the new beverage parameter set as an additional beverage parameter set is carried out depending on the location, in which the beverage dispenser is installed, and the current weather. The method can propose the beverage that is adapted to the current weather or location, such as a gym, SPA or the like.

In one embodiment, the method may transmit by near field communication the additional beverage parameter set by the antenna of the beverage dispenser under control of the dispenser controller, if the user selects on the user to store the additional beverage parameter set and if the beverage vessel is detected in the proximity of the beverage dispenser. The additional beverage parameter set is received by the antenna of the beverage vessel by near field communication. The additional beverage parameter set is stored in the memory of the beverage vessel under control of the vessel processor. The additional beverage parameter set associated to the additional proposed beverage is stored in the memory of the beverage vessel and/or in a memory of the personal electronic device. Thereby, signals, such as audio signals or messages, output by the personal electronic device can be reduced, since new beverage is proposed by the beverage dispenser.

In one embodiment, the method outputs the user interface on a suitable display of the beverage dispenser, such as a touch sensitive screen. In another embodiment the method outputs the user interface on the personal electronic device. The personal electronic device may be coupled with the beverage dispenser by a near field network, such as RFID or Bluetooth, or any other suitable wireless network.

In one embodiment the method may detect by the program running on the personal electronic device that the beverage vessel is positioned in the proximity of the personal electronic device by near field communication. The method may transmit a request from the personal electronic device to the beverage vessel by near field communication under control of the vessel processor to transmit the at least one additional beverage parameter set. The vessel processor may read at least one additional beverage parameter set from the memory of the beverage vessel under control of the vessel processor. The method may transmit by the antenna of the beverage vessel to the antenna of the personal electronic device by near field communication the at least one additional beverage parameter set under control of the vessel processor. The antenna of the personal electronic device may receive the at least one additional beverage parameter set under control of the personal electronic device controller. The method may display on the personal electronic device information about the beverage parameter set as information about the additional beverage. The user can judge based on the displayed information about the additional beverage, whether he will consume the beverage in the future or whether he will ignore the additionally proposed beverage.

In one embodiment the additional beverage defined by the additional beverage parameter set may be selected as preferred beverage on a user interface of the program running on the personal electronic device. The method may store the additional beverage set in the beverage data. The method may transmit the beverage data from the antenna of the personal electronic device to the antenna of the beverage vessel by near field communication controlled by the personal electronic device processor, after presence of the beverage vessel in the proximity of the personal electronic device has been detected by the personal electronic device by near field communication. The method may store the beverage data in a memory of the beverage vessel controlled by the vessel processor after receiving the beverage data by the antenna of the beverage vessel. The additional beverage is stored as a favorite in the beverage data. As soon as the user positions the beverage vessel in the proximity of the beverage dispenser the user may select the additional beverage parameter set of the additional beverage as beverage to be filled into the beverage vessel.

The method may receive at the personal electronic device information about a new beverage defined by a new beverage parameter set under control of the personal electronic device controller from a remote server by a wide area network. The user may select the new beverage defined by the new beverage parameter set as preferred beverage on the user interface of the program running on the personal electronic device. The method may store the new beverage defined by the new beverage parameter set as beverage data. The method may transmit the beverage data from the antenna of the personal electronic device to the antenna of the beverage vessel by near field communication controlled by the personal electronic device processor, after presence of the beverage vessel in the proximity of the personal electronic device has been detected by the personal electronic device by near field communication. The method may store the beverage data in a memory of the beverage vessel controlled by the vessel processor after receiving the beverage data by the antenna of the beverage vessel by near field communication. The data about the new beverage may be transmitted by the wide area network, such as the internet to the personal electronic device, for example by a push message. The user can decide, whether he wants to consume the new beverage. If the user decides to consume the new beverage, the new beverage parameter set is stored in the beverage data and transmitted to the beverage vessel.

The method may transmit a user request from the antenna of the personal electronic device to the antenna of the beverage vessel by near field communication controlled by the personal electronic device processor after presence of the beverage vessel in the proximity of the personal electronic device has been detected by the personal electronic device, wherein the user request commands the beverage vessel processor to transmit information for identifying the user of the beverage vessel. After receiving the user request by the antenna of the beverage vessel, the method reads the stored information for identifying the user from the memory of the beverage vessel under control of the beverage vessel processor. The method transmit the information for identifying the user by the antenna of the beverage vessel to the antenna of the personal electronic device under control of the beverage vessel processor.

After receiving the information for identifying the user by the antenna of the personal electronic device by near field communication, the method compares by the personal electronic device processor, whether the received information for identifying the user is identical with information for identifying the user stored in the personal electronic device. If the received information for identifying the user is not identical with the information for identifying the user are stored in the personal electronic device, the method displays a message on the user interface of the personal electronic device that the user of the personal electronic device is not allowed to send a message to the beverage vessel by the antenna of the personal electronic device by near field communication. In this case, the beverage vessel and/or the beverage vessel processor is assigned to a single user and must not be used by another user.

Alternatively or additionally, if the received information for identifying the user is not identical with the information for identifying the user stored in the personal electronic device, the method may send a command to the beverage vessel under control of the controller of the personal electronic device requesting to delete beverage data in the memory of the beverage vessel by near field communication. In this case, on data stored in the memory of the beverage vessel processor may be deleted.

If the received information for identifying the user is identical with the information for identifying the user stored in the personal electronic device, the method can operate as described above.

In the memory of the beverage vessel processor data may be stored indicating that the data are stored in the memory of the beverage vessel processor must not be overwritten and/or erased.

It is to be understood, that the data stored by the program running on the personal electronic device can be backed up, such as on a cloud-based backup system.

The invention also discloses a portable beverage vessel having a container comprising a bottom portion forming the lower end of the container. The bottom portion may extend at least partially essentially in a horizontal direction and a wall extending from the wall portion, such as a perimeter of the bottom portion in an essentially vertical direction. The beverage vessel further comprises a magnetic coupling element arranged at the container. The beverage vessel further comprises a control device having a complementary magnetic coupling element adapted to be releasably coupled with the magnetic coupling element. The control device comprises at least on near field communication antenna, a transceiver for transmitting and receiving data, a power storage, a memory for storing data and a vessel processor adapted to execute computer program code and adapted to control the transceiver and the memory.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

The present invention is now explained in further detail by explanatory and non-limiting embodiments with reference to the enclosed drawings, wherein.

DETAILED DESCRIPTION OF THE INVENTION

Figure 1:
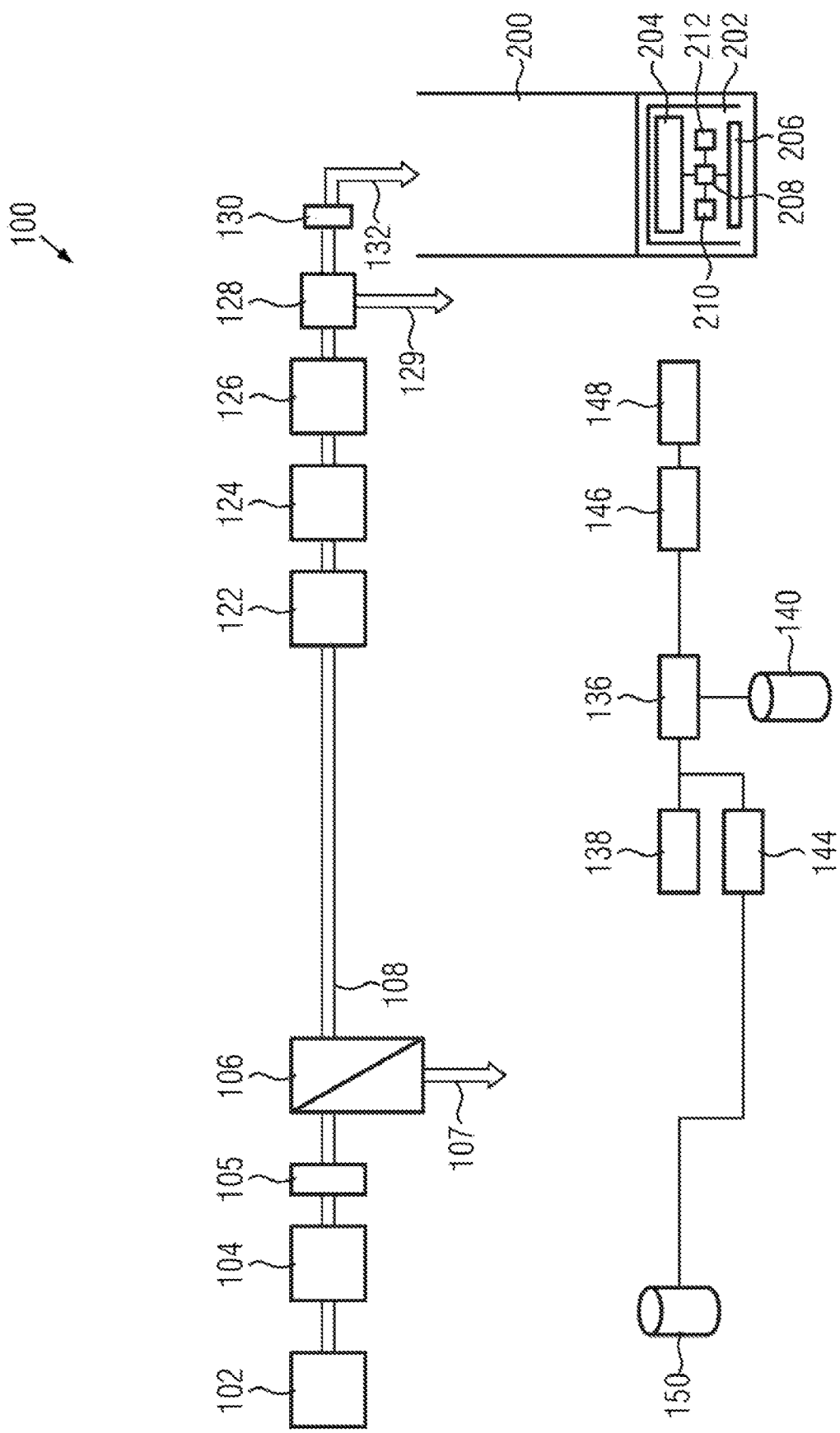
FIG. 1 is a schematic diagram of a first embodiment of a beverage dispenser a the portable beverage vessel.

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

The invention is now explained in further detail with reference to the attached drawings. None of the drawings is drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on." Spatial relationships like "above", "blow" or the like are not to be interpreted limiting.

Figure 1A:
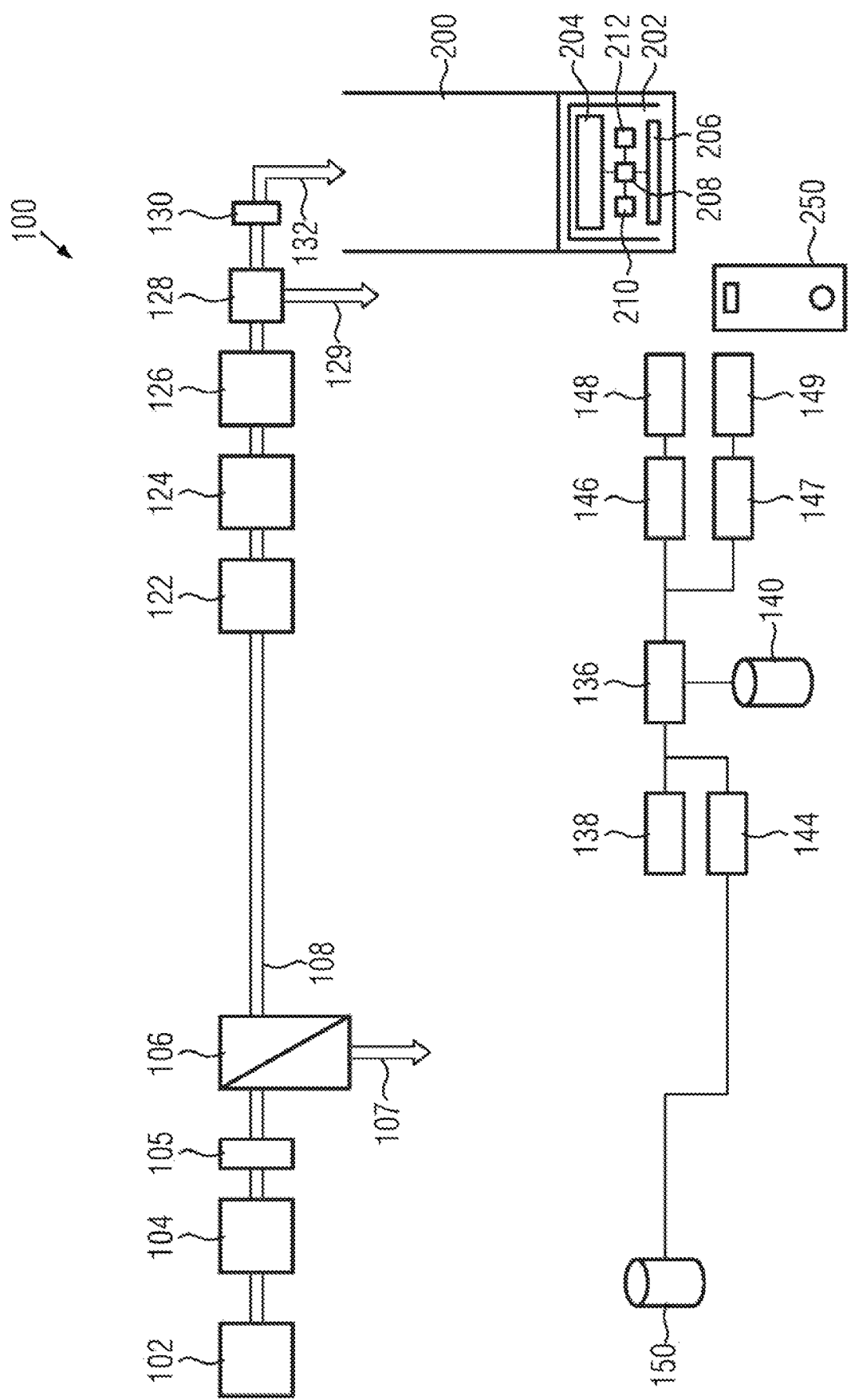
FIG. 1a is a schematic diagram of the second embodiment of the beverage dispenser and the portable beverage vessel.

Reference is made to FIG. 1a showing a beverage dispenser 100 according to the present invention. The water dispenser 100 is connected to a water source 102 that may be tap water or a tank.

The water source 102 is connected by a conduit with a pre-filter 104 which may comprise a sediment filter and/or an activated carbon filter.

The pre-filter 104 is connected to a reverse osmosis filter 106 acting as demineralization device. The water drawn from the water source 102 is pressurized by a pump 105 before entering the reverse osmosis filter. Operation of a reverse osmosis filter 106 is known to the person skilled in the art, and therefore operation of the reverse osmosis filter 106 does not have to be explained in further detail. The concentrate, in which the undesired components, such as minerals, heavy metals or the like are solved, as well as filtered microorganisms are output to a drain 107.

The water (permeate) output by the reverse osmosis filter 106 is fed to a flow-type tempering device 122 forming a beverage preparation device. The flow-type tempering device 122 is tempering the water to a temperature set by a dispenser controller 136. The set temperature of the water to be output by the flow-type tempering device 122 is commanded by the dispenser controller 136. The water flows from an output of the flow-type tempering device 122 to the input of a flow-type carbonization device 124 adding carbon dioxide to the water as set by a dispenser controller 136.

From an output of the flow-type carbonization device 124 forming also a beverage preparation device, the water flows to a flow-type mineralization device 126 also forming a beverage preparation device. The dispenser controller 136 controls the mineralization device 126 such that the water output by the flow-type mineralization device comprises the minerals desired by a user.

The flow-type mineralization device 126 may comprise a plurality of vessels filled with mineralization fluid, wherein a plurality of micro metering pumps delivers the mineralization fluids in the respective desired quantity into the water flowing through an input of the flow-type mineralization device 126 to an output of the flow-type mineralization device 126. Such flow-type mineralization device is for example disclosed in the European patent application EP18207971.5, which is incorporated herein in its entirety by reference. The water flows from the output of the flow-type mineralization device 126 to an output valve 128 and passes through a retrograde contamination prevention device 130, such as a UV light source, before it is output by a nozzle to a portable beverage vessel 200. The portable beverage vessel 200 may be a glass, a cup, a bottle, a carafe or the like. The portable beverage vessel 200 may be suitable for carrying beverage for a single person or a small group of persons, such as 1 to approximately 10 persons. "Portable beverage vessel" in the context of the present invention means that the beverage vessel may be carried by a person, such as a waiter, nurse or a user.

All components of conduits, the flow-type tempering device 122, the flow-type carbonization device 124, the flow-type mineralization device 126, the output valve 128, the retrograde contamination prevention device 130 and the nozzle 132 are made of metal and/or glass that is biological inert. Also, the output port for permeate of the reverse osmosis filter 106 is made of biological inert material, particularly a biological inert metal. The biological inert metal may comprise stainless steel, VA steel, VA1 steel, VA2 steel, VA3 steel, VA4 steel or the like. A biological inert material is a material that does not serve as nutrition for germs, microorganisms, a biological film, bacteria, virus or the like. Germs cannot form on biological inert metal contrary to plastics. Thereby, germ formation and deposition of biological films are prevented.

In the beverage dispensing operation mode, the controller controls the pump 105 after a request of a user to dispense beverage such that in all beverage preparation devices 122, 124, 126 an equal flow rate is achieved.

The beverage dispenser 100 according to the present invention further comprises an user interface 138 such as a touch sensitive screen, by which the user may select the type of beverage and/or parameters of the beverage to be dispensed. The parameters of the beverage to be dispensed may comprise the temperature of the beverage, the carbonization of the beverage, the mineralization of the beverage, any type of flavoring agents or the like. The parameters may be individually selectable by a user or may be determined by predefined recipes or types of beverage displayed on a display. The recipe may be a reference to list defining type and quantity of ingredients or a list defining type and quantity of ingredients. The parameter may include an identification of a user who requests the beverage.

The recipes may be stored in a database 140 of the beverage dispenser 100. The user may select the appropriate recipe by the user interface 138. The recipe defines the type of beverage and parameters of beverage to be output.

Figure 2:
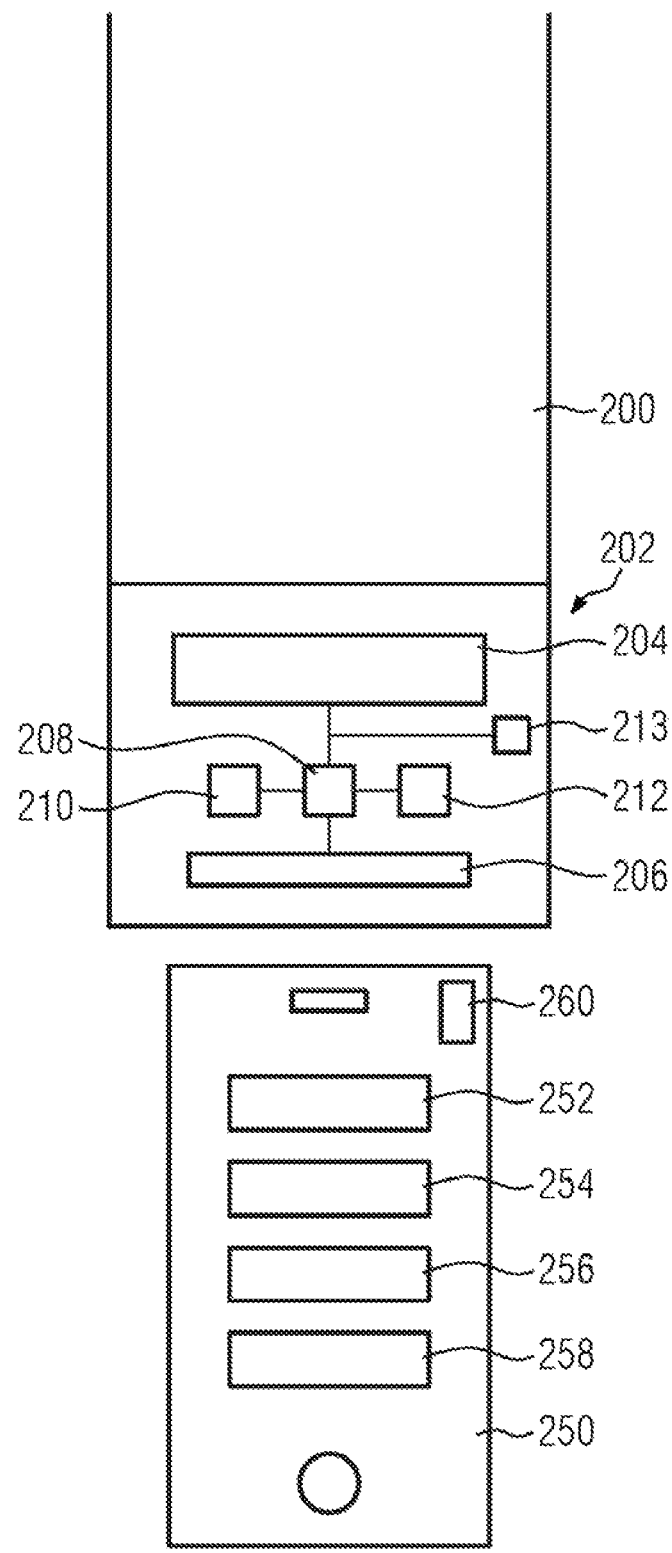
FIG. 2 shows a schematic diagram depicting the portable beverage vessel and a personal electronic device.

Reference is made to FIG. 2. The portable beverage vessel 200 comprises a vessel antenna 206, a vessel transceiver 208, a vessel processor 210, a vessel memory 212 and a display element 204. A user may select on a user interface of a personal electronic device 250, such as a mobile phone, a smart phone, a tablet computer or the like a water recipe defining a beverage parameter set. Icons 252, 254 and 256 displayed on the user interface represent different water recipes and/or different beverage parameter sets. Each beverage parameter set may comprise a list of minerals, concentration of each of the minerals in the beverage, type and concentration of flavors, the volume of the portable beverage vessel, the volume to be dispensed in the portable beverage vessel, the set temperature of the beverage to be dispensed and/or the set mineralization of the beverage to be dispensed. As soon as the user has selected the desired water recipe 252, 254, 256, the user positions this personal electronic device 250 in the proximity of the beverage vessel, particularly in proximity of the antenna 206 of the beverage vessel. Preferably, the distance between the near field antenna 260 of the personal electronic device 250 is positioned at a distance of less than approximately 5 cm, preferably less than proximately 3 cm, more preferred less than approximately 1 cm from the vessel antenna 206. The communication protocol for transmitting information from the antenna 260 of the personal electronic device 250 to the vessel antenna 206 is a near field communication protocol, such as RFID. The antenna 260 of the personal electronic device 200 transmits a RF field for powering the vessel processor 210 and the vessel memory 212.

The near field signal may be an RFID signal, such as in the 125 kHz, 134 kHz or 13.56 MHz frequency band. The vessel antenna 206 is coupled with the vessel transceiver 208 demodulating the near field signal and extracting energy for supplying the vessel processor 210, the memory 212 and the display element 204 with energy (energy harvesting). The energy may be stored in a capacitor 213. The radio range of the near field communication from antenna to antenna may be smaller than approximately 5 cm, preferably smaller than approximately 3 cm, more preferred smaller than approximately 1 cm. In one embodiment, the NTAG 213/215/216 Forum2 at 13.56 MHz is used.

The beverage vessel 200 may comprise an impedance matching circuit coupled with the vessel antenna 206. The impedance matching circuit ensures that an appropriate amount of energy is transferred from the vessel antenna 206. The radio signal of the radio message induces an AC current in the vessel antenna 206 and the impedance matching circuit. The AC current is rectified by a rectifier circuit to a DC power. The voltage of the DC power may be increased by a voltage multiplier. The DC power may be supplied to the vessel processor 210, the vessel memory 212 or the like. The DC power may be stored in the capacitor 213. This process is known as energy harvesting. The vessel memory 212 may be an EEPROM. The vessel processor 212 and the vessel memory may be implemented on the same semiconductor device.

The RF filed must be activated before any communication with the beverage vessel 200. After the RF filed in activated the vessel processor 210 performs a power on reset. Thereafter, the vessel processor 210 listens for received message. The vessel processor 210 executes the commands in the messages, stores data in the vessel memory 212, reads data from the vessel memory and/or transmits data to the transmitter of the message received.

The vessel processor 210 is only powered by the radio message and/or the RF field, if the vessel antenna 206 is positioned in the proximity of the antenna 260 of the personal electronic device 250. Thereby, it can be ensured that the personal electronic device 250 communicates only with a single beverage vessel 200 and powers only a single beverage vessel 200. Thereby, the method according to the present invention can determine that the beverage vessel 200 is positioned in the proximity of the personal electronic device 250. For powering the vessel processor 210 the personal electronic device 150 must emit the RF field during the entire communication with the beverage vessel 200.

As soon as a transmit icon 258 is pressed, the processor of the personal electronic device 250 transmits via the antenna 260 of the personal electronic device 250 by near field communication the beverage data to the vessel antenna 206. The beverage data includes the beverage parameter set and an identification of the user of the personal electronic device 250 and a volume of the portable beverage vessel. The identification of the user can be input by the user or retrieved from the data are stored on the personal electronic device 250, such as the name of the personal electronic device, the name of the current user of the mobile electronic device 250 or the like.

The vessel transceiver 208 decodes the message received by the vessel antenna 206 and the processor 210 stores the beverage data received by the message from the personal electronic device 250 in the vessel memory 212. The beverage data received from the personal electronic device may include one beverage parameter set or a plurality of beverage parameter sets. After the beverage data is stored by the vessel processor 210 in the vessel memory 212 the user can carry the beverage vessel 200 to the water dispenser 100 shown in FIG. 1.

Reference is made to FIG. 1 again. If the dispenser controller 136 detects that the portable beverage vessel 200 is arranged in the beverage dispenser 100, the dispenser controller 136 requests the vessel processor 210 to transmit beverage data. The vessel processor 210 loads the beverage data from the vessel memory 212 and transmits the beverage data by the vessel transceiver 208 and the vessel antenna 206 to the dispenser antenna 148. The dispenser antenna 148 receives the beverage data and the beverage data is transferred by the dispenser transceiver 146 to the dispenser processor 136. The dispenser antenna 148 may emit a RF field for powering the vessel processor 210 and the vessel memory 212. The RF field must be emitted during the entire communication process between the beverage dispenser 100 and the beverage vessel 200.

The vessel processor 210 is only powered by the radio message and/or RF field, if the vessel antenna 206 is positioned in the proximity of the dispenser antenna 148. Thereby, it can be ensured that the beverage dispenser 100 communicates only with a single beverage vessel 200 and powers only a single beverage vessel 200. Thereby, the method according to the present invention can determine that the beverage vessel 200 is positioned in the proximity of the beverage dispenser 100.

In one embodiment the dispenser controller 136 may detect that the portable beverage vessel 200 is arranged in the beverage dispenser 100 by NFC.

The dispenser processor 136 analyses the beverage data. If the dispenser processor 136 detects that the beverage data comprises only a single beverage parameter set, the dispenser controller 136 retrieves the appropriate recipe from the database 140. In one embodiment, the beverage data may comprise a number, a reference, an index, a hash value or the like referring to the recipe stored in the database 140.

In one embodiment the dispenser processor 136 may instruct as described below the appropriate components of the beverage dispenser to generate beverage. In another embodiment the dispenser processor 136 may display a start button on the user interface 138 and commence preparing the beverage by instructing as described below the appropriate components of the beverage dispenser to generate beverage after the user has pressed the start button.

Thereafter, the dispenser controller 136 instructs as described above generation of the beverage. Particularly, the dispenser processor 136 instructs the pump 105 to pump an aqueous liquid through the reverse osmosis filter 106 to the tempering device 122. The dispenser controller 136 instructs the tempering device 122 to temper the aqueous liquid as defined in the beverage parameter set. The tempered aqueous liquid is passed to the carbonization device 124. The dispenser controller 136 instructs the flow-type carbonization device 124 to carbonize the aqueous liquid as defined in the beverage parameter data. Thereafter, the aqueous liquid is passed to the flow-type mineralization device 126. The dispenser controller 136 instructs the flow-type mineralization device 126 to mineralize the beverage as defined in the water recipe retrieved from the database 140 or in the beverage parameter set. Thereafter, the beverage is output into the beverage vessel 200.

Thereafter, the dispenser processor 136 instructs the vessel processor 210 to display beverage data on the display element 204. The displayed data may comprise the identity of the user, a representation of the recipe of the beverage dispensed into the portable beverage vessel 200, the amount of beverage dispensed into the beverage vessel 200, the date of dispensing, the time of the dispensing, the dispensed volume, the temperature of the beverage dispensed, the carbonization of the beverage dispensed, the total volume of beverage dispensed within a predetermined time span, the amount of saved one-way bottles or the like. In one embodiment the vessel controller 136 can transmit the data to be displayed on the display element 204 by near field communication to the vessel processor 208. In another embodiment, the dispenser controller 136 can request the vessel controller 208 to retrieve the necessary data from the vessel memory 212 and to display it on the display element.

The display element 204 may including, at least one LED, at least one OLED, a LED display, an OLED display, a display matrix, an e-paper, an electrophoretic e-paper, a liquid crystal e-paper, a bi-stable display, a bi-stable liquid crystal display. E-paper, electrophoretic e-paper, the bi-stable display and the bi-stable liquid crystal display have the advantage, that no energy is needed for displaying information on the display element, once the information has been updated on the display element 204. The information may be displayed as symbols, alphanumeric characters, colours, coloured icons or the like. If a single or small number of LED(s) or OLED(s) are used as display element 204, the information may be coded by the colour emitted by the LED(s) or OLED(s) and/or a flashing frequency of the LED(s) or OLED(s).

If the dispenser processor 136 detects during analyzing the beverage data that the beverage data comprises a plurality of beverage parameter sets, the dispenser processor 136 instructs the user interface 138 to display a plurality of graphical symbols, such as a text, icons or the like, each representing one beverage parameter set. In one embodiment, the graphical user interface 138 may display the name of the water recipe associated with each beverage parameter set in the beverage data. The name of the water recipe can be stored in the data base 114 and retrieved by the beverage parameter set. Each beverage parameter stored in the beverage data can be one of the favorite recipe of the user.

The user may select on the user interface 138 one representation of a beverage parameter set as the desired beverage to be dispensed. Thereafter, the dispenser processor 138 continues to dispense the beverage as described above by instructing the appropriate components of the beverage dispenser 100 to generate the beverage, such as the pump 105, the reverse osmosis filter 106, the flow-type tempering device 122, the flow-type carbonization device 124 and the flow-type mineralization device 126.

In one embodiment, the dispenser processor 136 instructs the vessel processor 208 to display data about the selected beverage and/or beverage parameter set on the vessel controller 204 as well as to display information identifying the user. In one embodiment, the dispenser processor 136 transmits via near field communication a reference to the selected beverage and/or beverage parameter set. In another embodiment the dispenser processor 136 may transmit the beverage parameter set, namely at least one value of the beverage parameter set.

In one embodiment the beverage dispenser 100 is connected to a remote server 150. The dispenser controller 136 may receive new beverage recipes and/or beverage parameter sets from the remote server 150 and store the new beverage recipes and/or beverage parameter set in the database 140. The program running on the personal electronic device 250 can analyse the beverage consumption of the user as described above to generate usage data. The usage data may be stored in the beverage data. In one embodiment, a classification of the beverage preference of the user may be stored in the beverage data.

If the user positions the beverage vessel 200 at the beverage dispenser as described above, the vessel processor 208 may transmit the usage data via near field communication to the dispenser controller 136. If the dispenser controller 136 determines that the usage data matches to or corresponds with the recommended consumer types of the new beverage recipe and/or beverage parameter set, the dispenser controller 136 proposes the user the new beverage recipe and/or beverage parameter set on the user interface 138 to the user. The user may select the new beverage recipe and/or beverage parameter set as beverage to be dispensed. The dispenser controller 136 continues dispensing beverage as described above with the selected beverage parameter set. Further, the dispenser controller 136 and the vessel processor 208 to display the selected beverage parameter set on the vessel controller. Further, the selected beverage parameter set will be stored in the vessel memory as instructed by the dispenser controller 136 to the vessel processor 210.

If the user has not select the new beverage recipe and/or beverage parameter set to be dispensed after recommending it by the user interface 138 of the beverage dispenser 100, the dispenser controller 136 may ask the user by information displayed on the user interface 138, whether he wishes to consume the new beverage recipe and/or beverage parameter set later. If the user presses on the user interface 138 the appropriate symbol indicating that he agrees to consume the new beverage at a later time, the dispenser controller 136 instructs the vessel processor 210 to store the new beverage recipe and/or beverage parameter set in the vessel memory 212.

As soon as the personal electronic device 250 detects presence of the beverage vessel 200 by near field communication, the vessel processor 210 may receive the new beverage data and/or the new beverage parameter set and store it in the vessel memory 212. The personal electronic device 250 may display information about the new beverage data and/or the new beverage parameter set on the display of the personal electronic device 250.

In one embodiment the dispenser processor may activate the RF field emitted by the dispenser antenna 148 permanently to detect presence of the beverage vessel and send a message to a potential beverage vessel 200 for identifying the beverage vessel 200. In another embodiment the dispenser processor may activate the RF field emitted by the dispenser antenna 148 intermittently to detect presence of the beverage vessel 100. The vessel processor may activate periodically the RF field and send a message to a potential beverage vessel 200 for identifying the beverage vessel 200. If no response is received from a beverage vessel, the RF filed is deactivated for a predetermined time span that may rage for example between 50 msec and 0.3 seconds. Thereafter, the vessel processor may activate again the RF field and send a message to a potential beverage vessel 200.

Reference is made to FIG. 1a showing a second embodiment of the beverage dispenser 100 and beverage vessel 200. In the second embodiment the dispenser processor does not output data on the user interface 138 of the beverage dispenser 100 but on the display of the personal electronic device 250. The personal electronic device 250 is coupled with the vessel processor 136 by the near field antenna 260 of the personal electronic device 250 the user interface NFC antenna of the beverage dispenser 100 and the user interface NFC transceiver of the beverage dispenser 100. In this embodiment at least a part of the graphical user interface is displayed on the personal electronic device 250, and at least a part of the user input is entered on the touch sensitive user interface of the personal electronic device. Thereby, hygienic conditions are improved since each user only utilizes the touch sensitive display of his personal electronic device.

Figure 3:
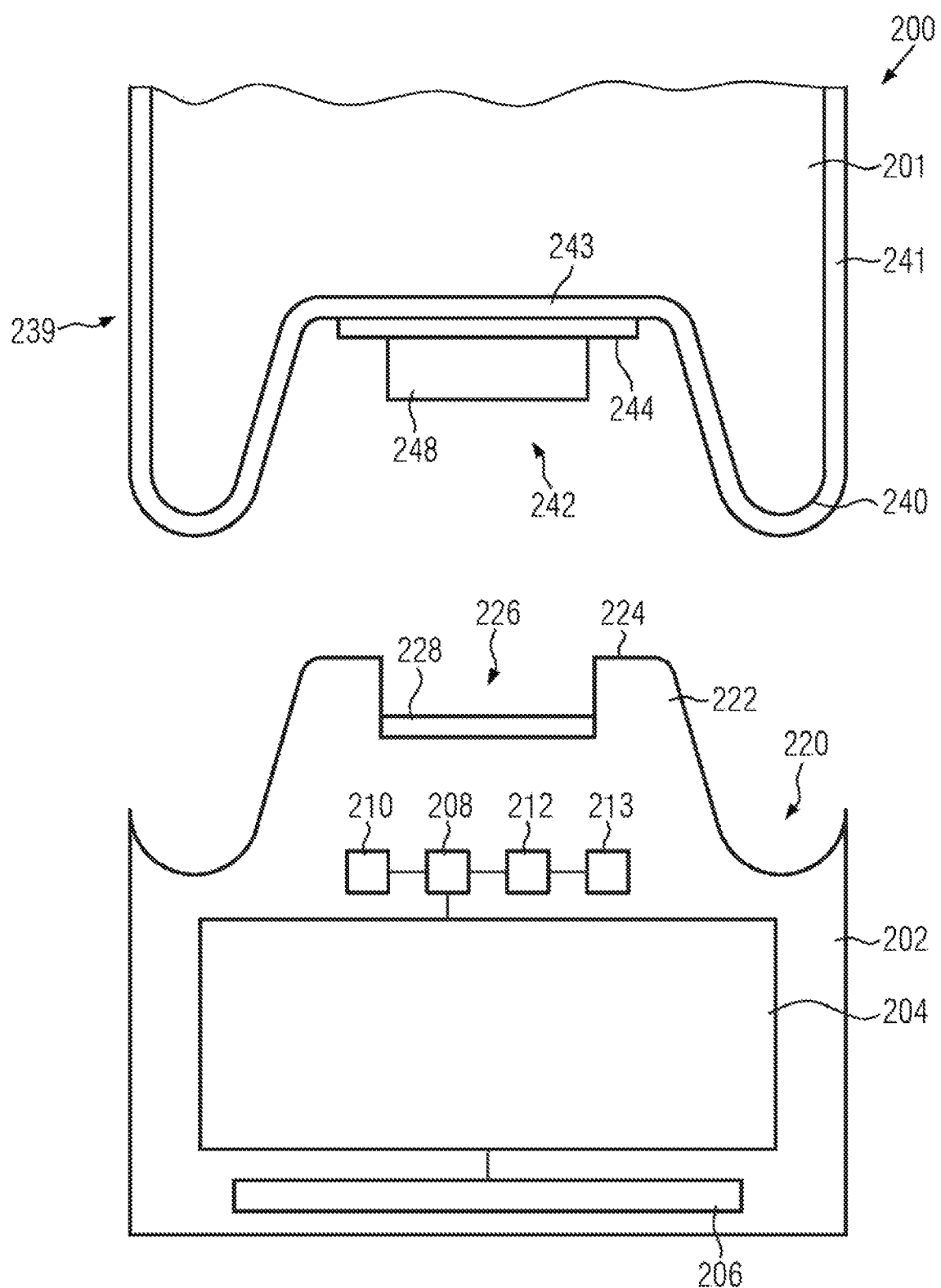
FIG. 3 shows a first embodiment of the portable beverage vessel and the vessel controller.

Reference is made to FIG. 3 showing a cross section of view of a first embodiment of a beverage vessel 200 according to the present invention. The beverage vessel 200 according to the present invention comprises a container 201 and a vessel controller 202 that can easily secured with the container 201. During consumption of beverage and during dispensing beverage into the container 201 the vessel controller 202 is secured with the container 201. During cleaning the container 201 the vessel controller 202 can be released from the container 201. Thereby, damage of the vessel controller 202 in a dish washer can be avoided.

The container 201 comprises a bottom portion 239 forming the lower end of the container. The radially outer perimeter of the bottom portion is formed as a pedestal portion 240. If the container 201 as a circular cross section, the pedestal portion 214 at the outer perimeter of the bottom portion 239 is essentially doughnut shaped. Radially inward of the pedestal portion 240 a recess 242 is formed that extends into the interior of the vessel container 201. A wall 243 of the bottom portion 239 forms the pedestal portion 240 that is arranged at the outer perimeter of the bottom portion 239 and that is connected to the wall 241 of the container extending essentially in the upward direction. The wall 243 of the bottom portion 239 forms the recess 242 radially inward of the pedestal portion 240.

The wall 243 of the bottom portion 239 extends essentially horizontally in the central portion of the bottom portion 239. At the outer surface of the wall 243 of the bottom portion 239 an optional connection element 244 is glued at the surface directed outward of the container 201. The connection element 244 may be elastic. A first magnetic coupling element 248 is fixed at the lower side of the connection element 244, but may be directly secured on the lower surface of the wall 243 of the bottom portion 239.

The vessel controller 202 comprises the display element 204, the vessel antenna 206, the vessel transceiver 208, the vessel processor 210, the vessel memory 212 and the capacitor 213 as described above and operating as described above. On the upper side the vessel controller 202 an annular recess 220 is formed adapted to accommodate the pedestal portion 240 of the container 201. On the upper side of the vessel controller 202 a second magnetic element 228 is arranged. The second magnetic element 228 is arranged above the annular are recess 220 such that the first magnetic element 248 and the second magnetic element 228 are arranged as close as possible or contact each other, if the vessel controller 202 is coupled with the container 201 and the pedestal portion 240 is arranged in the annular recess 220. Around the second magnetic element 228 a flange 224 is formed essentially annularly and extending in the upper direction from the second magnetic element 228 and forming a recess 226 above the second magnetic element 228. If the vessel controller 202 is coupled with the container 201 the flange 224 is arranged around the first magnetic element 248 and supports aligning and securing the vessel controller 202 with the container 201.

At least one of the first magnetic element 248 and the second magnetic element 228 is a permanent magnetic element. It is also possible, that one of the first magnetic element 248 and the second magnetic element 228 is a permanent magnetic element and the outer magnetic element is a ferromagnetic element.

It is an advantage of the present invention that the vessel controller 202 can be easily coupled with the container 201 and released from the container 201. Further, performance of the beverage dispenser 100 is increased significantly, since the user needs to spend less time at the beverage dispenser 100 for selecting the desired beverage. Further, the present invention avoids use of one-way bottles, since each user can select the desired beverage by his personal electronic device. Less one-way bottles have to be transported and less storage space is required at the point of use such as an office, a gym, a bar, a hotel lobby, in a nursing home, rail stations, airports or the like.

In another embodiment the beverage dispenser may receive a request for beverage comprising the recipe and the volume of beverage to be output by a network interface 144. The network interface 144 may be a wireless network interface such as WLAN and/or a wire bound network interface such as an Ethernet interface.

The user and/or the beverage vessel 200 may be identified by the beverage dispenser, for example by communication with the beverage vessel 200. Therefore, the beverage vessel may comprise an RFID tag or any other device that is suitable for near field communication or mobile communication.

It is also possible that the user transmits his beverage order from a mobile device or any other computer via a network, such as a wireless network, to the beverage dispenser 100. The order may include the type of beverage, a recipe for preparing the beverage, a volume of beverage, the temperature of the beverage to be dispensed, the carbonization of the beverage to be dispensed or the like. Particularly, the beverage dispenser 100 receives information relating to the beverage comprising, but not limited to the type of beverage to be dispensed, an identification of a user, who requested the beverage, an identification of a location in a restaurant, a hotel or a meeting area to which the portable beverage vessel has to be carried, the volume of the beverage, the time stamp of the filling event, a parameter of the beverage to be dispensed, such as temperature, carbonization, mineralization, flavoring or other useful information for defining the beverage order. The dispenser controller 136 stores the information relating to beverage for preparing the beverage, and the dispenser controller 136 controls the beverage preparation devices 122, 124, 126 such, that beverage according to the information relating to the beverage is generated.

In a public environment, such as a restaurant, a bar, a hotel, a meeting room environment or the like a waiter or assistant may ask a plurality of users, which beverage they prefer. The waiter and/or assistant may forward the order of the users to the beverage dispenser 100, such as by a mobile electronic device (not shown) or by entering the order at the user interface 138. The waiter and/or assistant will receive order for beverage from a plurality of users, but the waiter and/or assistant cannot distinguish the beverage, as soon as the beverage is output to the user vessel. Particularly, the users may order different types of water having individualized mineralization. However, the assistant and/or waiter cannot distinguish the different individualized waters, as soon as they are dispensed into the respective portable beverage vessel 200.

Therefore, the assistant and/or waiter can add an identification of the user, who requested the beverage, to the order of a beverage to the beverage dispenser. Thus, the assistant and/or waiter has supplied the beverage dispenser 100 and the dispenser controller 136 with all required information relating to the requested beverage.

Therefore, the beverage dispenser 100 according to the present invention comprises a near field transceiver 146 operatively coupled with the dispenser controller 136. The dispenser controller and the near field transceiver 146 transmit information relating to the beverage comprising, but not being limited to the type of beverage in the portable beverage vessel, an identification of a user, who requested the beverage, an identification of a location in a restaurant, a hotel or a meeting area to which the portable beverage vessel has to be carried, the volume of the beverage, the time stamp of the filling event, a parameter of the beverage in the portable beverage vessel, such as temperature, carbonization, mineralization, flavoring or any other useful information relating to the beverage in the portable beverage vessel to the vessel controller 202 of the portable beverage vessel 200. The portable beverage vessel 200 comprises a vessel antenna 206, a vessel transceiver 208, a vessel processor 210, a memory 212 and a display element 204.

The near field transceiver 146 transmits a near field signal to the vessel antenna 206 of the portable beverage vessel 200. The near field signal may be an RFID signal, such as in the 125 kHz, 134 kHz or 13.56 MHz frequency band. The vessel antenna 206 is coupled with the vessel transceiver 208 demodulating the near field signal and extracting energy for supplying the vessel processor 210, the memory 212 and the display element 204 with energy (energy harvesting). The energy may be stored in a capacitor 213.

The vessel processor 210 decodes the information in the near field signal and displays the information on the display element 204. The information displayed on the display element 204 including, but not being limited to at least one LED, at least one OLED, a LED display, an OLED display, a display matrix, an e-paper, an electrophoretic e-paper, a liquid crystal e-paper, a bi-stable display, a bi-stable liquid crystal display. E-paper, electrophoretic e-paper, the bi-stable display and the bi-stable liquid crystal display have the advantage, that no energy is needed for displaying information on the display element, once the information has been updated on the display element 204. The information may be displayed as symbols, alphanumeric characters, colours, coloured icons or the like. If a single or small number of LED(s) or OLED(s) are used as display element 204, the information may be coded by the colour emitted by the LED(s) or OLED(s) and/or a flashing frequency of the LED(s) or OLED(s).

Since information relating to beverage is displayed in the display element after the near field signal has been received, the waiter and/or assistant can recognize the intended user of the portable beverage vessel. In other words, the information displayed on the display element 204 indicates, to which user the portable beverage vessel 200 has to be carried.

The display element may display an identification of the user who ordered the beverage. This allows to ensure that the beverage vessel 200 is assigned to the user who ordered the beverage. In case the assistant and/or waiter has supplied the beverage dispenser 100 with the order (information relating to beverage), the identification of the user on the display element 204 of the beverage vessel ensures that the beverage vessel is carried to the user, to whom the beverage is assigned. If the user has supplied the beverage dispenser 100 with the beverage order (information relating to the beverage) the identification of the user displayed on the display element 204 ensures that the beverage vessel cannot be confused with a beverage vessel of another user, if a plurality of beverage vessels are located in the same area, such as during a business meeting, during a break of team sports or the like. In both cases the information displayed on the display element 204 may also comprise the beverage recipe, a mineralization of water, a temperature of the beverage and the carbonization of the beverage dispensed into the portable beverage vessel 200.

Particularly in nursing environment transmitting the time stamp of the filling event to the vessel controller 202 and displaying the time stamp of the filling event is useful to monitor beverage consumption of patients. In other environments transmitting the time stamp of the filling event to the vessel controller 202 and displaying the time stamp of the filling event is useful to enable a user to determine the quality of the beverage.

The beverage vessel 200 may be a bottle, a carafe, a glass, a cup or the like. The container 201 may be made of glass, $SiO_2$ or the like. The housing of the vessel controller 202 may be made of any suitable material such as metal, plastics, ceramics or the like.

Figure 4:
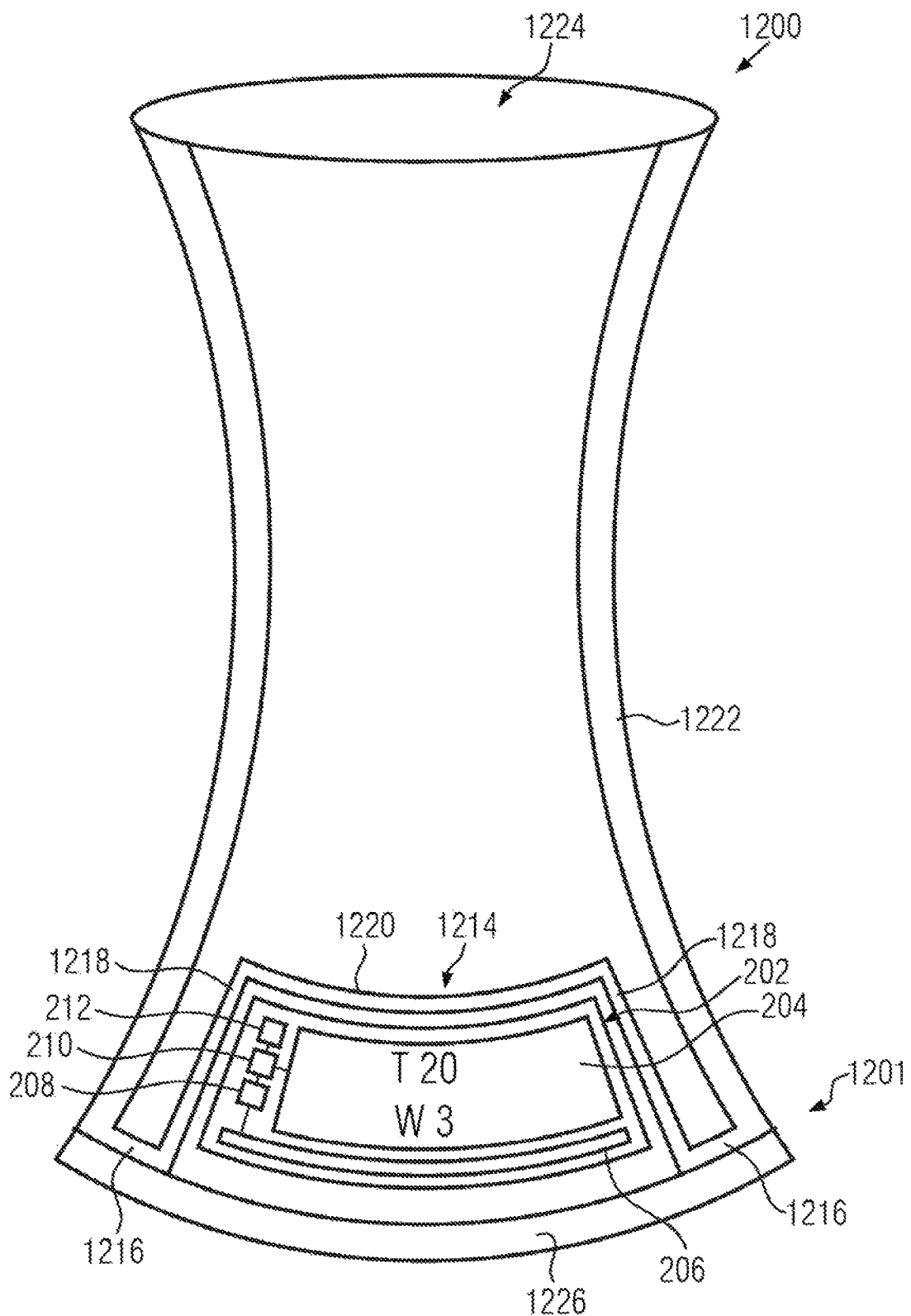
FIGS. 4 and 5 show schematic views of a second embodiment of the portable beverage vessel.
Figure 5:
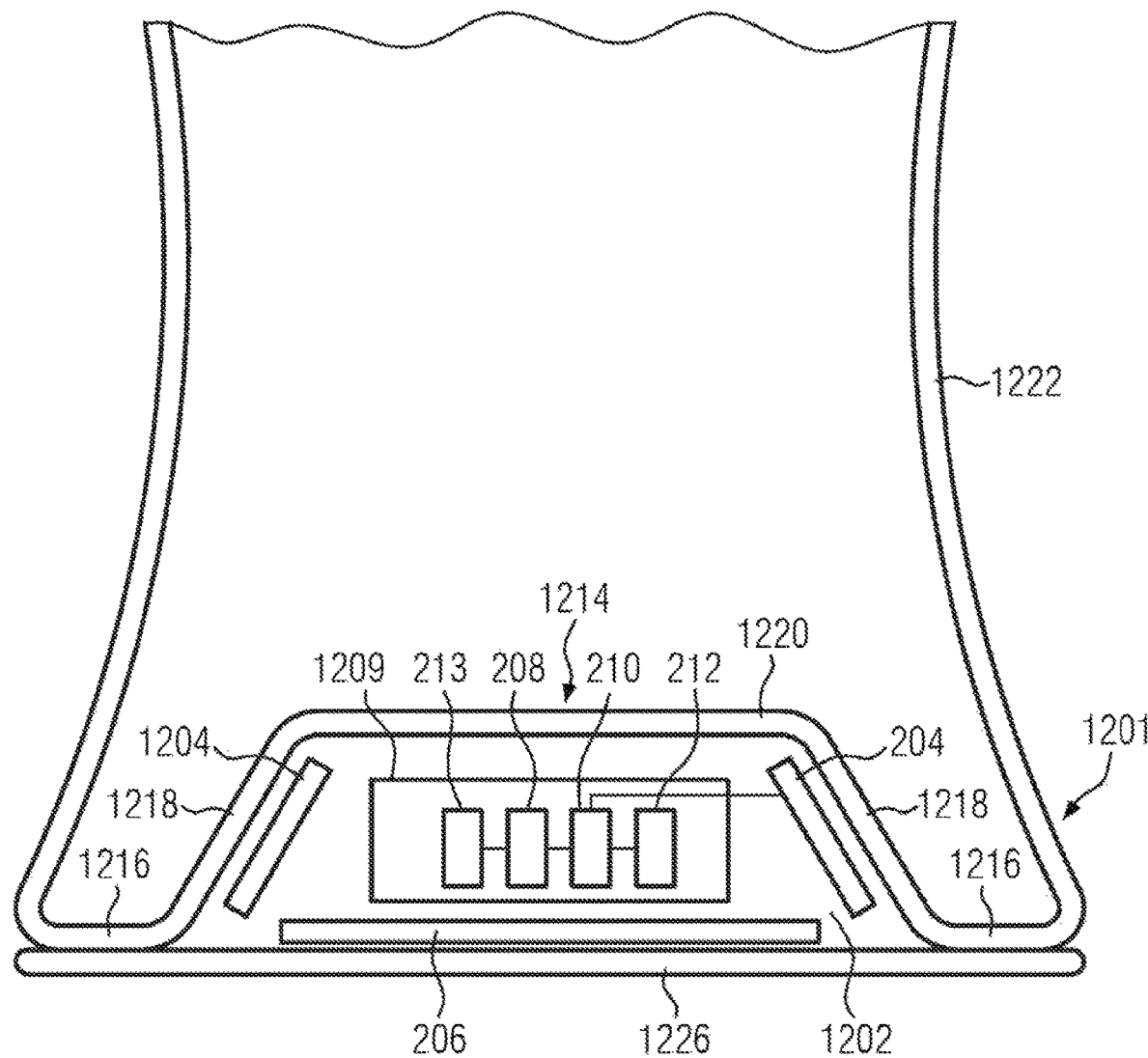

Reference is made to FIGS. 4 and 5 showing a second embodiment of the portable beverage vessel 1200 according to the present invention, wherein FIG. 4 shows a schematic front view and FIG. 5 shows a schematic cross section of the portable beverage vessel 1200. The beverage vessel 1200 comprises a wall 1222 extending from a first container element (first bottom element) 1214 at the bottom portion 1201 comprising a first section 1216, a second section 1218 and a third section 1220. The wall 1222 forms an opening 1224 through which beverage can be poured into and out of the beverage vessel 1200. The beverage vessel 1200 depicted in FIG. 4 is embodied by a carafe. Other types of the portable beverage vessel 1200 may be embodied by a bottle, by a glass, a cup, by a mug or the like.

The second embodiment of a portable beverage vessel 1200 further comprises a second container element (second bottom element) 1226 at the bottom portion 201 coupled with the first container element 1214. The first section 1216 of the first container element 1214 is coupled with the second container element 1226. The wall 1222, the first container element 1214 and the second container element 1226 are made of glass, generally comprising $SiO_2$. The first section 1216 of the first container element 1214 is welded with the second container element 1226.

In one embodiment the first container 1214 element may be welded with the second container element 226 by thermal heating such as heating by hydrogen flame, electricity or a gas flame.

In another embodiment the first container element 1214 may be welded with the second container element 226 by laser. In still another embodiment the first container element 1214 may be welded with the second container element 226 by infrared radiation. The first container element 1214 may be welded with the second container element 2126 by infrared laser radiation. In yet another embodiment the first container element 1214 may be welded with the second container element 1226 by infrared laser pulses.

From the first section 1216 of the first container element 1214 a second section 1218 extends directed to the opening 1224. The third section 1220 of the first container element 1214 is generally parallel to the second container element 1226. The cross section in the vertical plane of the first container element 1214 is generally trapezoid. The shape of a cavity formed between the first container element 1214 and the second container element 226 is generally truncated.

It is to be understood that the portable beverage vessel 1200 may be formed rotational symmetric around its vertical axis.

Within the cavity between the first container element 1214 and second container element 226 the vessel controller 1201 is arranged comprising the display element 204, the vessel antenna 206, the vessel transceiver 208, the vessel processor 210 and the memory 212. Operation of the vessel controller 202 has been explained with reference to FIGS. 1 to 3. The vessel antenna 206 may be located juxtaposed to the second container element 226. In one embodiment, the display element may extend by 360° around the vertical axis of the portable beverage vessel 200, for example juxtaposed to the second container element 226. The display element 204 may be located around the vessel transceiver 208, the vessel processor 210, the memory 212 and a capacitor 213. The capacitor 213 is supplied with energy form the vessel antenna 206 and a supply circuit (not shown). The capacitor 213 supplies the vessel transceiver 208, the vessel processor 210, the memory 212 and the display element 204 with energy. The vessel transceiver 208, the vessel processor 210, the memory 212 and the capacitor 213 may be located in a housing 1209. It is to be understood that the vessel antenna 206 may be located at any other suitable location.

Welding the second container element 1226 to the first container element 1214 has the advantage that the vessel controller 202 is protected from wear. Further, welding of the second container element 1226 to the first container element 1214 leads to a fluid proof, particularly waterproof, coupling such that no water can enter the cavity or gas can exit the cavity. The cavity may be filled with an inert gas or vacuumed for avoiding fogging of the walls of the cavity, such as fogging sections of the first container element 1214 and second container element 1226. The portable beverage vessel 1200 may be formed generally rotational symmetric around its vertical axis.

The display element 204 displays that the portable beverage vessel 1200 is intended for table 20 and is filled with water recipe 3.

Figure 6:
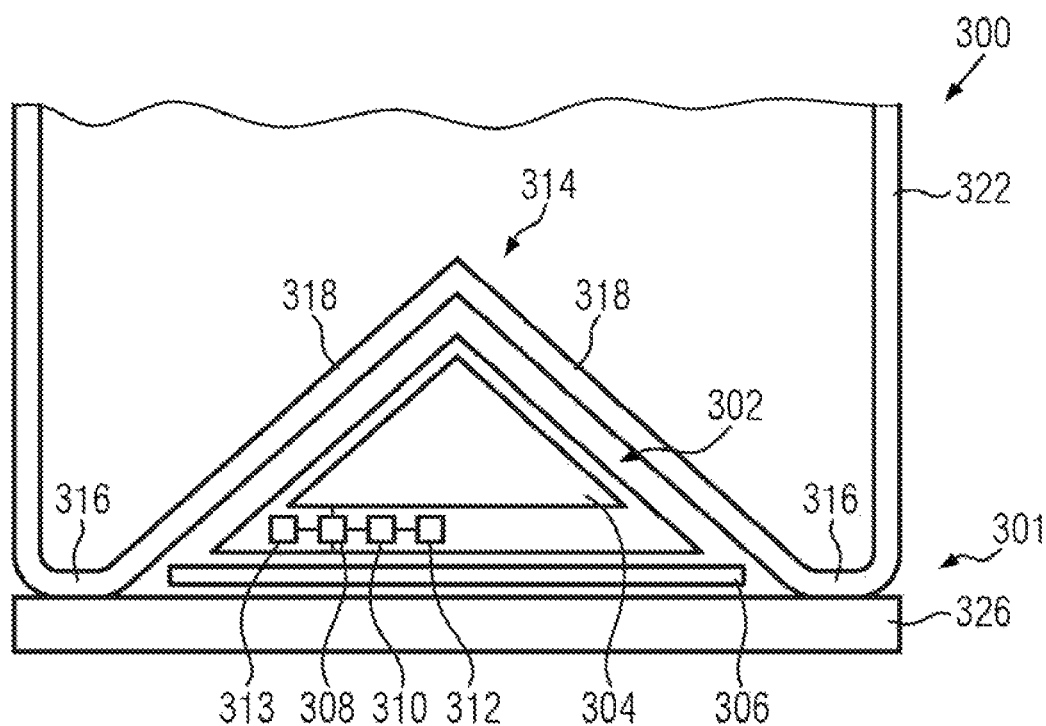
FIG. 6 shows a schematic cross section of a third embodiment of the portable beverage vessel.

Reference is made to FIG. 6, showing a third embodiment of the portable beverage vessel 300 according to the present invention. The third embodiment 300 essentially corresponds to the second embodiment shown in FIG. 2, wherein similar components are denoted with the same reference numerals increased by the value 100. A wall 322 extends from a first container element (first bottom element) 314 at the bottom portion 301. The wall 322 forms an opening (not shown) through which beverage can be poured into the portable beverage vessel or out of the portable beverage vessel 300. The first section 316 of the first container element 314 is coupled with a second container element (second bottom element) 326 at the bottom portion 301 by welding. The first container element 314 comprises a second section 318 comprising an inclined cross section in the vertical plane. The second section 318 of the first container element 314 and the second container element 326 form a cavity that is essentially triangular in the vertical cross section. The cavity between the first container element 314 and the second container element 326 is generally cone shaped.

It is to be understood that the portable beverage vessel 300 may be formed rotational symmetric around its vertical axis.

The first container element 314, the second container element 326 and the wall 322 may be made of glass, $SiO_2$ or plastics.

Within the cavity a third embodiment of the vessel controller 302 is arranged. The vessel controller 302 comprises an antenna 306, a transceiver 308, a processor 310, a memory 312 and a capacitor 313. The capacitor 313 stores energy transmitted with the near field signal received by the antenna 306. The capacitor 313 supplies the processor 310, the memory 312 and the display element 304 with power, after the near field signal has been terminated. If the display element 304 is implemented by e-paper, electrophoretic e-paper, the bi-stable display and the bi-stable liquid crystal display, no energy or power is required by the display element 304 after information has been updated thereon.

Generally, the vessel controller 302 according to the third embodiment is operated and configured as the vessel controller 202 described with reference to FIGS. 1 and 2.

Figure 7:
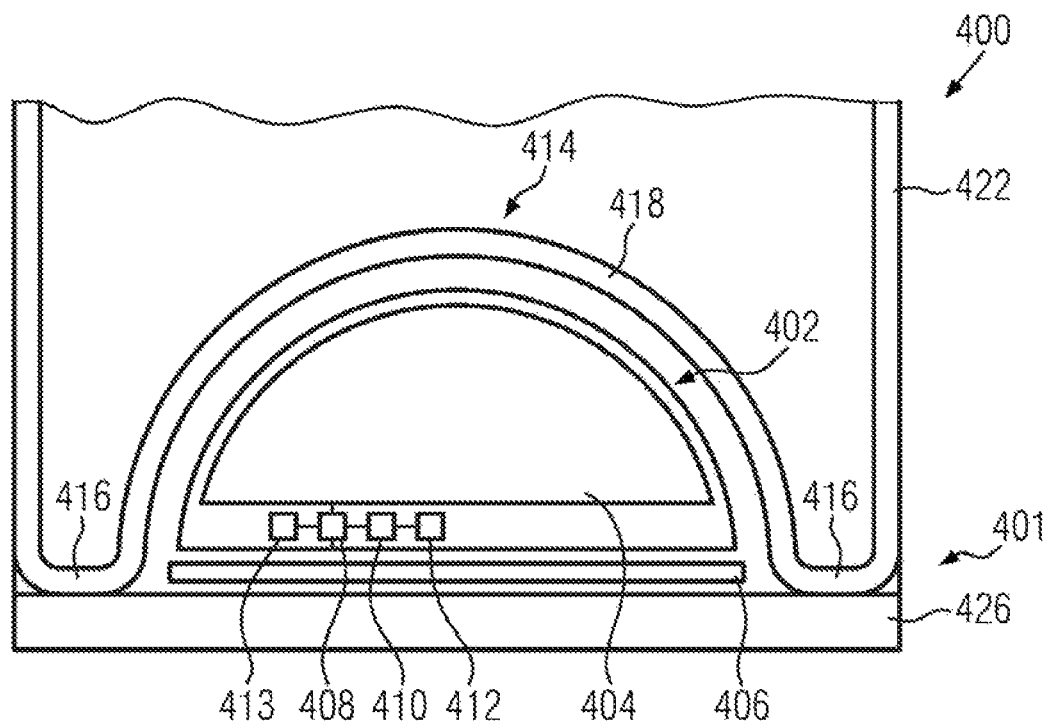
FIG. 7 shows a schematic cross section of a fourth embodiment of the portable beverage vessel.

Reference is made to FIG. 7, showing a fourth embodiment of the portable beverage vessel 400. Like components are denoted by the same reference numerals as with FIG. 2, wherein a value of 200 is added to the reference numerals according to FIG. 2. A wall 422 extends from a first section 416 of a first container element (first bottom element) 414 at the bottom portion 401 of the portable beverage vessel 400. The wall 422 forms an opening through which liquid can be poured into or out of the beverage vessel 400, wherein the opening is located opposite to the first container element. The first section 416 of the first container element 414 is connected to a second container element (second bottom element) 426 by welding.

It is to be understood that the portable beverage vessel 400 may be formed rotational symmetric around its vertical axis. The first container element 414, the second container element 426 and the wall 422 may be made of glass, $SiO_2$ or plastics.

The first container element 414 comprises a second section 418, wherein the second section 418 and the second container element 426 form an essentially semi spherical cavity, in which a vessel controller 402 according to the fourth embodiment is located. The vessel controller 402 comprises an antenna 406, a transceiver 408, a processor 410, a memory 412, a capacitor 413 and a display element 404. The vessel controller 402 according to the fourth embodiment is operated and configures as the vessel controller 202 according to the second embodiment and the vessel controller 302 according to the third embodiment.

Figure 8:
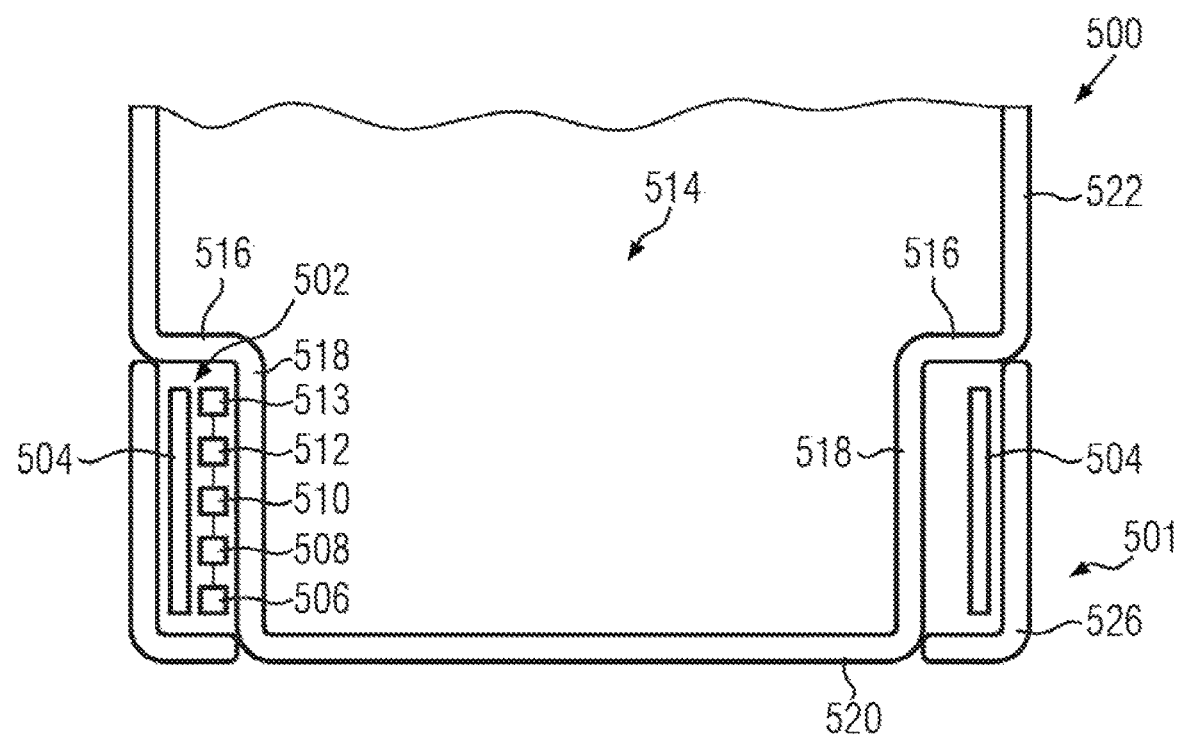
FIGS. 8 and 9 show schematic views of a fifth embodiment of the portable beverage vessel.
Figure 9:
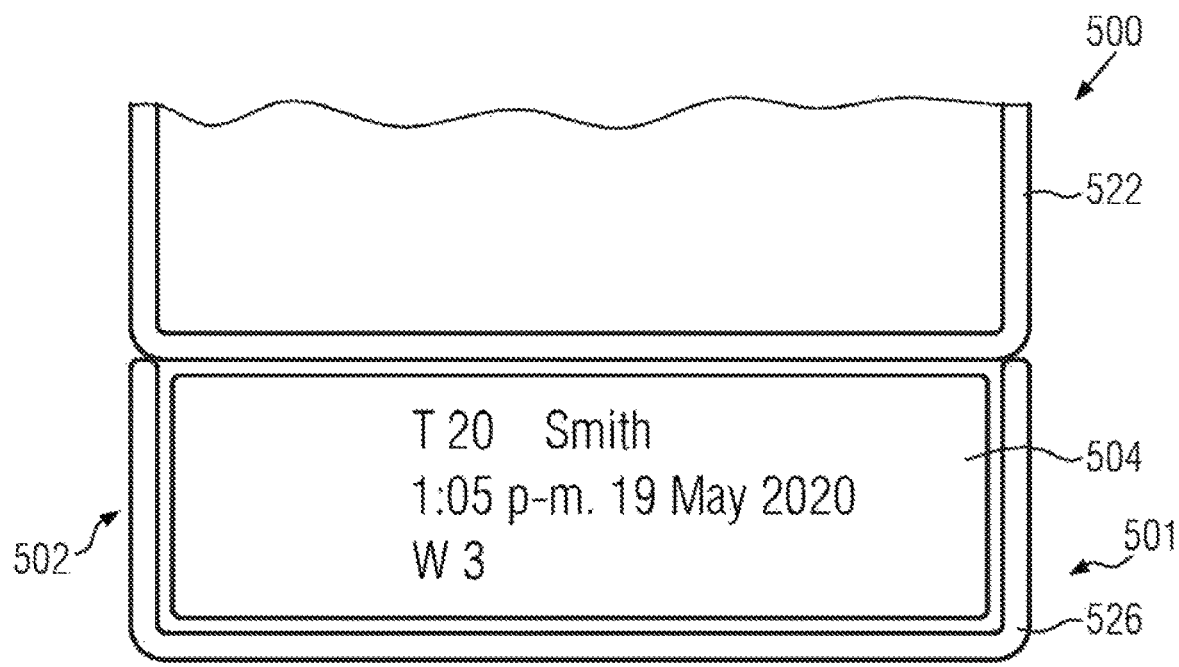

Reference is made to FIGS. 8 and 9 showing a fifth embodiment of the portable beverage vessel 500, wherein FIG. 8 shows a schematic sectional view and FIG. 9 shows a schematic front view of the portable beverage vessel 500 according to the present invention.

The portable beverage vessel 500 comprises a bottom section 501 having a first container element (first bottom element) 514.

Further, the portable beverage vessel 500 comprises a wall 522. The bottom section comprises a first section 516 that extends from a lower section of the wall 522 in a generally horizontal direction. From the first section 516 a second section 518 extends in the downward direction of the portable beverage vessel 500. A third section 520 is connected to the second section 518. The third section 520 generally extends in the horizontal direction.

The portable beverage vessel 500 further comprises a second container element 526. The second container element 526 is both a second bottom element and second wall element. The second bottom element is securely connected with the third section 520 and the wall 522, such as by a welding as described above. In one embodiment, the lower portion of the second container element 526 is connected with the joint of the second portion and third portion. The upper end of the second container element 526 may be connected to the joint of the wall 522 and the first section 516.

It is to be understood that the portable beverage vessel 500 may be formed rotational symmetric around its vertical axis. The first container element 514, the second container element 526 and the wall 522 may be made of glass, $SiO_2$ or plastics.

Between the first container element 514 and the second container element 520 a cavity is formed. More particularly, the cavity is formed between the first section 516 of the first container element 514 and second section 518 of the first container element 514 and the second container element 526.

Within the cavity a vessel controller 502 having a display element 504, an antenna 506, a transceiver 508, a processor 510, a memory 512 and a capacitor 513 is arranged. In the fifth embodiment of the portable beverage bottle 500 the vessel controller are operated and configured as described above with the other embodiments according to FIGS. 1 to 5.

The display element 504 extends around the vertical axis of the portable beverage vessel 500 juxtaposed to the second container element 526. FIG. 7 shows that the display element 504 displays information relating to the beverage. The portable beverage vessel 500 is intended to be delivered to table 20 to a person called Smith. The portable beverage vessel 500 has been filled at 1:05 p.m. on 19 May 2020 with water recipe 3.

Figure 10:
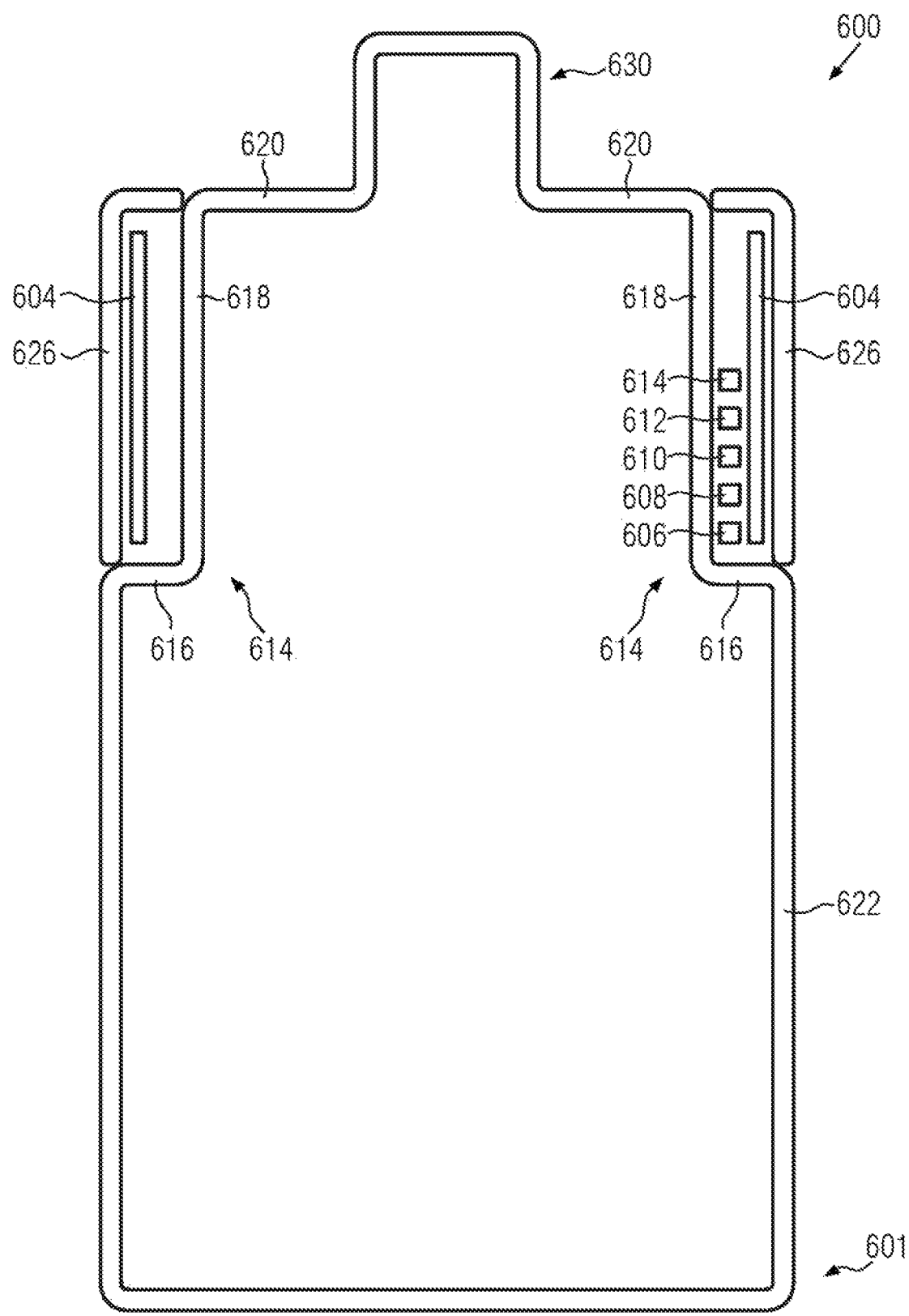
FIG. 10 shows a schematic cross section of a sixth embodiment of the portable beverage vessel having the display element placed into the wall of the portable beverage vessel.

Reference is made to FIG. 10 showing a sixth embodiment of the portable beverage vessel 600 according to the present invention. The portable beverage vessel 600 comprises a bottom portion 601. A wall 622 extends in the upward direction of the portable beverage vessel 600 from the bottom portion 601. The portable beverage vessel 600 further comprises a neck 630 comprising an opening through which beverage can be poured into and out of the portable beverage vessel 600. From the wall 622 a first section 616 extends radially inward. The first section 616 is coupled with a second section 618 generally extending in the upward direction. The second section 618 is coupled to a third section 620 extending radially inward. The third section 620 may extend to the bottleneck 630. At least the first section 616 and second section 618 form a first container element.

A second container element 626 is connected to the wall 622 and the third section 620. Particularly, the lower end of the second container element 626 is connected to the joint between the wall 622 and the first section 616. The end opposite to the lower end of the second container element 626 is connected with the joint of the second section 618 and third section 620.

It is to be understood that the portable beverage vessel 600 may be formed rotational symmetric around its vertical axis. The first container element 614, the second container element 626 and the wall 622 may be made of glass, $SiO_2$ or plastics.

Between the first container element 614 and the second container element 626 a cavity is formed. Particularly, the cavity is formed between the second container element 626, the first section of the first container element 614 and the second section 618 of the first container element 614.

Within the cavity a vessel controller 602 having a display element 604, and antenna 606, a transceiver 608, a processor 610, a memory 612 and a capacitor 614 is located. In the sixth embodiment of the portable beverage vessel 600 the vessel controller 604 are operated and configured as described above with the embodiments of the portable beverage vessel shown in FIGS. 1 to 9.

Figure 11:
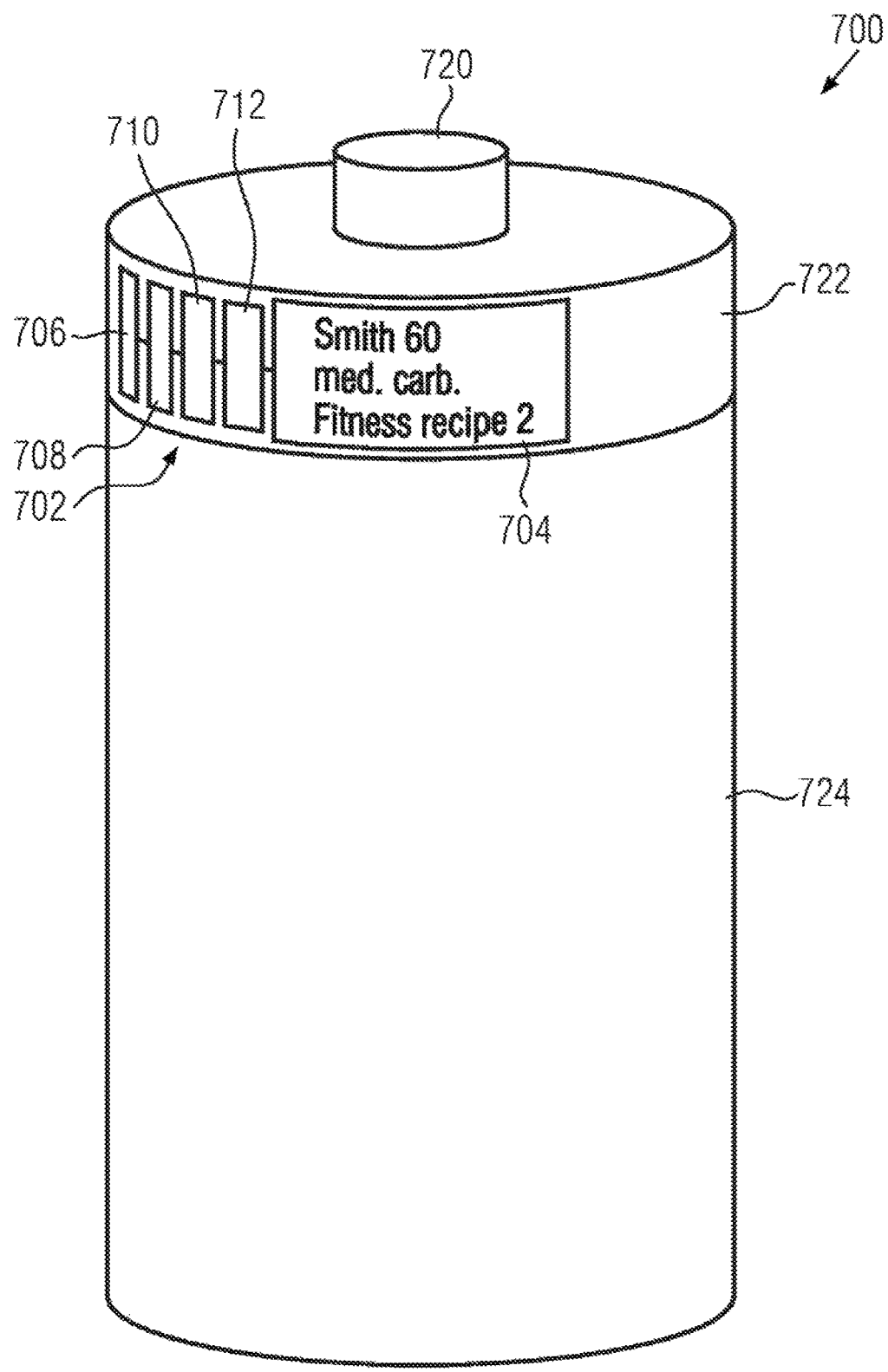
FIG. 11 shows a seventh embodiment of the present invention as a portable bottle.

Reference is made to FIG. 11 showing a seventh embodiment of the beverage vessel 700 according to the present invention. The beverage vessel 700 is a bottle, particularly a smart bottle as disclosed in the European patent application EP 3 434 151, the contents of which are included by reference in its entirety to the present patent application.

The bottle 700 comprises a generally cylindrical member 724, which may be made of steel. Within the cylindrical member 724 a bottle element may be accommodated. The portable bottle 700 further comprises a lid 720 that can be screwed or unscrewed from the bottle 700. Above the cylindrical element 722 a donut shaped element 722 is located around the neck of the bottle 700. The donut shaped element 722 may be embodied as a technology carrier. The technology carrier may comprise a battery, a processor and at least one sensor, such as a temperature sensor, an acceleration sensor or the like. The temperature sensor may determine the temperature in the environment of the bottle 700. Thereby, the processor can estimate the temperature of the beverage in the bottle and/or the beverage that has to be consumed by the user for compensating the hydration.

Particularly the donut shaped element 722 comprises a vessel controller 702 having a display element 704. The display element 704 may display that the bottle is assigned to a person named Smith. The water dispensed into the bottle 700 had a temperature of 6° C. The water has been carbonated to a medium carbonization. The water in the bottle has been mineralized according to a fitness recipe 2.

The vessel controller 702 comprises an antenna 706 connected to a transceiver 708. The donut shaped element 722 forming the vessel controller 702 further comprises a processor 710 operatively coupled with the transceiver 708, a memory 712 and the display element 704. The vessel controller 702 according to the seventh embodiment is operated as the vessel controller according to the first to sixth embodiment.

In one embodiment the vessel controller 202, 302, 402, 502 and 602 may be an RFID display. The RFID display is selected such that it comprises a maximum storage temperature of 60° C., since the portable beverage vessel is subjected to temperatures in a range of 55° C. to 60° C. in a dishwasher. Such RFID device with e-ink display is commercially available from P.E.R. Flucht- and Rettungssysteme GmbH, Germany under the product name PER-MALUX P-29E.

Welding the second container element 226, 326, 426, 526, 626 to the first container element 214, 314, 414, 514, 614 has the advantage that the vessel controller 202, 302, 402, 502, 602 is protected from wear. Further, welding of the second container element to the first container element leads to a fluid proof, particularly waterproof, coupling such that no water can enter the cavity or gas can exit the cavity. The cavity may be filled with an inert gas or vacuumed for avoiding fogging of the walls of the cavity, such as fogging sections of the first container element and second container element. The portable beverage vessel 200, 300, 400, 500, 600 may be formed generally rotational symmetric around its vertical axis.

In one embodiment a localized hydrogen flame may heat the first container element 214, 314, 414, 514, 614 and the second container element 226, 326, 426, 526, 626 for welding the first container element with the second container element. A hydrogen flame may have a temperature of 3000° C. for locally heating the first container element and the second container element before welding the first container element and the second container element. By this technique, the glass is only heated locally and for a short period.

In another embodiment the first container element and second container element may be welded by conventional techniques, such as by heating with a gas flame and/or electricity. In one embodiment a welding agent having a lower melting temperature as compared with the first container element and second container element may be placed between the first container element and second container element. In this embodiment the welding agent is melted for coupling the first container element and second container element as soon as the welding agent is cooled down.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. § 112(f) unless the words "means for" or "step for" are explicitly used in the particular claim. The above-described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A portable beverage vessel, comprising:
   a bottom portion;
   a wall extending from the bottom portion, wherein a upper portion of the wall forms an opening through which beverage can be poured into or out of the portable beverage vessel;
   a first container element;
   a second container element, wherein a cavity is formed between the first container element and the second container element; and
   a display device positioned in the cavity and having a display element for displaying information;
   wherein the display device comprises a receiving element for receiving information to be displayed by the display element, wherein the receiving element is adapted to at least one of the following:
   receiving radio communication;
   receiving a LF magnetic field;
   wherein the first container element can be at least a part of the bottom portion and/or at least a part of the wall;
   wherein the second container element can be at least a part of the bottom portion and/or at least a part of the wall; and
   wherein the first container element and the second container element comprise at least one of the following:
   glass;
   ceramics;
   $SiO_2$;
   wherein the first container element and the second container element are connected by at least one of welding, laser welding, infrared welding, infrared laser welding and welding by an infrared laser emitting pulses of a duration shorter than 1 psec.

2. The portable beverage vessel according to claim 1, characterized by at least one of the following:
   the wall is transparent;
   the first container element is transparent;
   the second container element is transparent.

3. The portable beverage vessel according to claim 1, wherein
   the bottom portion comprises the first container element and the second container element.

4. The portable beverage vessel according to claim 1, wherein
   the wall comprises the first container element and the second container element.

5. The portable beverage vessel according to claim 1, wherein the first container element and the second container element are connected by melting.

6. The portable beverage vessel according to claim 1, wherein first container element and the second container element form a cavity comprising the following shapes:
   disk shape;
   cone shaped;
   semispherical;
   truncated;
   tapered;
   a triangular cross section;
   a trapezoid cross section.

7. The portable beverage vessel according to claim 1, wherein the display device comprises at least one of the following:
   an antenna;
   a memory;
   a capacitor for storing operation power;
   a processor.

8. The portable beverage vessel according to claim 1, wherein the display element comprises at least one of the following:
   a LED;
   an OLED;
   a LED display;
   an OLED display;
   a display matrix;
   an e-paper;
   an electrophoretic e-paper;
   a liquid crystal display;
   a bi-stable display;
   a bi-stable liquid crystal display.

9. A method of manufacturing a portable beverage vessel comprising a bottom portion and a wall extending from the bottom portion, wherein the wall element forms an opening opposite to the bottom portion and wherein the method comprises the following steps:

providing a first container element, wherein the bottom portion and/or the wall comprises the first container element;
coupling the first container element with a second container element, wherein a cavity is formed between the first container element and second container element; and
positioning a display device having a display element between the first container element and the second container element before coupling the first container element with the second container element;

wherein the first container element and the second container element comprise at least one of the following:
  glass;
  ceramics;
  $SiO_2$;

wherein the step of coupling the first container element with the second container element comprises at least one of the following steps:

melting the second container element to the first container element;
welding the first container element with the second container element;
welding the first container element with the second container element by laser;
welding the first container element with the second container element by infrared radiation;
welding the first container element with the second container element by infrared laser radiation;
welding the first container element with the second container element by infrared laser pulses; and
welding the first container element with the second container element by infrared laser pulses shorter than 1 psec.

* * * * *